United States Patent
Bourdev et al.

(10) Patent No.: US 10,169,686 B2
(45) Date of Patent: Jan. 1, 2019

(54) SYSTEMS AND METHODS FOR IMAGE CLASSIFICATION BY CORRELATING CONTEXTUAL CUES WITH IMAGES

(71) Applicant: Facebook, Inc., Menlo Park, CA (US)

(72) Inventors: Lubomir Bourdev, Mountain View, CA (US); Balamanohar Paluri, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 217 days.

(21) Appl. No.: 13/959,446

(22) Filed: Aug. 5, 2013

(65) Prior Publication Data

US 2015/0036919 A1 Feb. 5, 2015

(51) Int. Cl.
| | |
|---|---|
| *G06K 9/72* | (2006.01) |
| *G06Q 50/00* | (2012.01) |
| *G06N 99/00* | (2010.01) |
| *G06F 17/30* | (2006.01) |
| *G06K 9/66* | (2006.01) |
| *G06K 9/62* | (2006.01) |
| *G06K 9/00* | (2006.01) |

(52) U.S. Cl.
CPC ......... *G06K 9/72* (2013.01); *G06F 17/30268* (2013.01); *G06F 17/30525* (2013.01); *G06K 9/00684* (2013.01); *G06K 9/6256* (2013.01); *G06K 9/66* (2013.01); *G06K 9/726* (2013.01); *G06N 99/005* (2013.01); *G06Q 50/01* (2013.01); *G06K 2209/27* (2013.01); *Y10S 707/915* (2013.01)

(58) Field of Classification Search
None
See application file for complete search history.

(56) References Cited

U.S. PATENT DOCUMENTS 5,909,510 A 6/1999 Nakayama
7,296,032 B1 * 11/2007 Beddow ............ G06F 17/30044
(Continued)

FOREIGN PATENT DOCUMENTS

CN 102057371 5/2011
JP 11-025127 A 1/1999
(Continued)

OTHER PUBLICATIONS

Lei Wu; Yang Hu; Mingjing Li; Nenghai Yu; Xian-Sheng Hua, "Scale-Invariant Visual Language Modeling for Object Categorization," Multimedia, IEEE Transactions on , vol. 11, No. 2, pp. 286,294, Feb. 2009.*

(Continued)

*Primary Examiner* — Kim Vu
*Assistant Examiner* — Nathan Bloom
(74) *Attorney, Agent, or Firm* — Sheppard Mullin Richter & Hampton LLP

(57) ABSTRACT

A sample set of images is received. Each image in the sample set may be associated with one or more social cues. Correlation of each image in the sample set with an image class is scored based on the one or more social cues associated with the image. Based on the scoring, a training set of images to train a classifier is determined from the sample set. In an embodiment, an extent to which an evaluation set of images correlates with the image class is determined. The determination may comprise ranking a top scoring subset of the evaluation set of images.

20 Claims, 13 Drawing Sheets

(56) References Cited

U.S. PATENT DOCUMENTS

| | | | |
|---|---|---|---|
| 9,037,600 B1* | 5/2015 | Garrigues | G06F 17/30265 |
| | | | 707/769 |
| 9,218,364 B1* | 12/2015 | Garrigues | G06F 17/30864 |
| 2007/0185858 A1* | 8/2007 | Lu | G06F 17/30864 |
| 2007/0217676 A1* | 9/2007 | Grauman | G06K 9/4671 |
| | | | 382/170 |
| 2007/0271297 A1* | 11/2007 | Jaffe | G06F 17/30041 |
| 2009/0083332 A1* | 3/2009 | Datta | G06F 17/30265 |
| 2009/0204637 A1 | 8/2009 | Li | |
| 2009/0240692 A1* | 9/2009 | Barton | G06F 17/3082 |
| 2010/0048242 A1 | 2/2010 | Rhoads et al. | |
| 2011/0085739 A1 | 4/2011 | Zhang | |
| 2011/0087660 A1 | 4/2011 | Yu et al. | |
| 2011/0188742 A1 | 8/2011 | Yu et al. | |
| 2011/0235900 A1 | 9/2011 | Porikli et al. | |
| 2012/0106854 A1 | 5/2012 | Tang et al. | |
| 2012/0269436 A1* | 10/2012 | Mensink | G06K 9/00624 |
| | | | 382/180 |
| 2013/0007667 A1* | 1/2013 | Sauve | G06F 17/30274 |
| | | | 715/838 |
| 2014/0307958 A1* | 10/2014 | Wang | G06K 9/6256 |
| | | | 382/159 |

FOREIGN PATENT DOCUMENTS

| | | |
|---|---|---|
| JP | 2009258953 | 11/2009 |
| JP | 2011523137 | 8/2011 |

OTHER PUBLICATIONS

Li, Jia, and James Z. Wang. "Real-time computerized annotation of pictures." IEEE transactions on pattern analysis and machine intelligence30.6 (2008): 985-1002.*

International Application No. PCT/US2014/015887, International Search Report and Written Opinion dated May 30, 2014.

Kumar, Neeraj et al., "Describable Visual Attributes for Face Verification and Image Search," IEEE Transactions on Pattern Analysis and Machine Intelligence, vol. 33, No. 10, pp. 1962-1977, Oct. 2011.

Si, Si et al., "Social Image Annotation via Cross-Domain Subspace Learning," Multimedia Tools and Applications, vol. 56, No. 1, pp. 91-108, Jul. 20, 2010.

European Patent Application No. 14179258.0, Search Report dated Jan. 8, 2015.

* cited by examiner

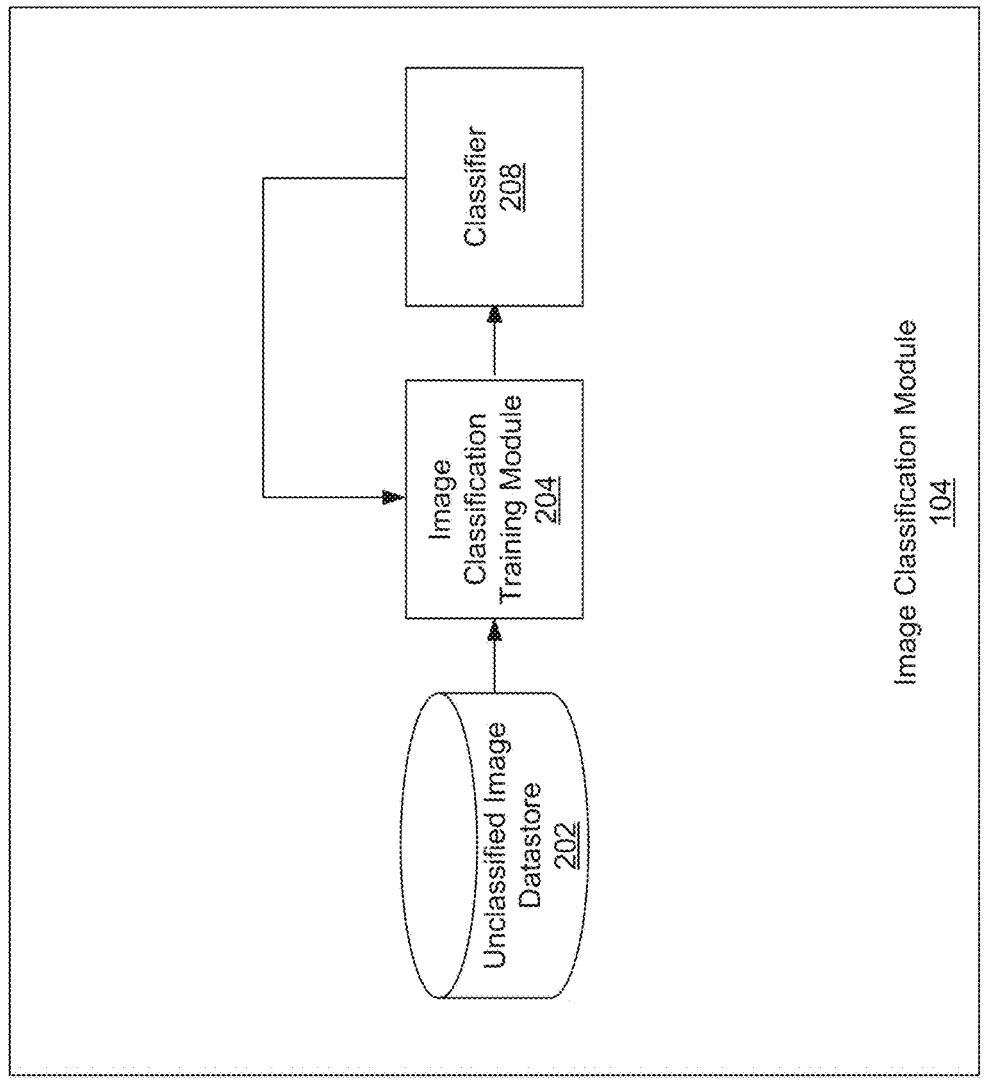

SYSTEMS AND METHODS FOR IMAGE CLASSIFICATION BY CORRELATING CONTEXTUAL CUES WITH IMAGES

TECHNICAL FIELD

The technical field relates to the field of social networks. More particularly, the technical field relates to image classification techniques in social networks.

BACKGROUND

A social network may provide an interactive and content rich online community that connects its members with one another. Members of a social network may indicate how they are related to one another. For instance, members of a social network may indicate that they are friends, family members, business associates, or followers of one another, or members can designate some other relationship to one another. Social networks may allow members to message each other or post messages to the online community.

Social networks may also allow members to share content with one another. For example, members may create or use one or more pages containing an interactive feed that can be viewed across a multitude of platforms. The pages may contain images, video, and other content that a member wishes to share with certain members of the social network or to publish to the social network in general. Members may also share content with the social network in other ways. In the case of images, members, for example, may publish the images to an image board or make the images available for searches by the online community.

SUMMARY

A system may comprise at least one processor and a memory that stores instructions configured to instruct the processor to perform receiving a sample set of images, each image in the sample set associated with one or more social cues. Correlation of each image in the sample set with an image class is scored based on the one or more social cues associated with the image. Based on the scoring, a training set of images to train a classifier may be determined from the sample set.

In some embodiments, the image class may be specified. In some embodiments, the determining may comprise ranking each image from the sample set based on the scoring. The determining may comprise selecting a top scoring subset of the sample set of images. The top scoring subset may be the training set of images.

In various embodiments, a classifier may be trained based on the training set of images. A visual pattern template associated with the image class may be generated. The classifier may be configured to use a bag of visual words image classification technique or a neural network image classification technique in some embodiments.

In some embodiments, an extent to which an evaluation set of images correlates with the image class may be determined. The evaluation set of images may be different from the sample set of images. The evaluation set of images may comprise a larger set of images than the sample set of images.

In various embodiments, the correlation of each image of the evaluation set of images with a visual pattern template associated with the image class may be scored. Each image of the evaluation set may be ranked based on the scoring correlation of each image of the evaluation set of images. A top scoring subset of the evaluation set of images may be associated with the image class.

In some embodiments, the one or more social cues may comprise one or more image tags. The number of instances of particular image tag among a total number of the one or more image tags associated with an image may be determined.

In some embodiments, the one or more social cues may comprise one or more of: location data associated with an image of the sample set of images; or an identity of an uploader, a tagger, or an owner of the image of the sample set of images. In various embodiments, the one or more social cues may be received by a social networking system.

A computer implemented method may comprise receiving, by a computer system, a sample set of images, each image in the sample set associated with one or more social cues. The method may include scoring, by the computer system, correlation of each image in the sample set with an image class based on the one or more social cues associated with the image. The method may also include determining, by the computer system, based on the scoring, a training set of images to train a classifier from the sample set.

A computer storage medium storing computer-executable instructions that, when executed, cause a computer system to perform a computer-implemented method comprising receiving a sample set of images, each image in the sample set associated with one or more social cues. The method may include scoring correlation of each image in the sample set with an image class based on the one or more social cues associated with the image. The method may also include determining, based on the scoring, a training set of images to train a classifier from the sample set.

Other features and embodiments are apparent from the accompanying drawings and from the following detailed description.

BRIEF DESCRIPTION OF THE DRAWINGS

FIG. 2A shows an example of an image classification module, in accordance with some embodiments.

Figure 1:
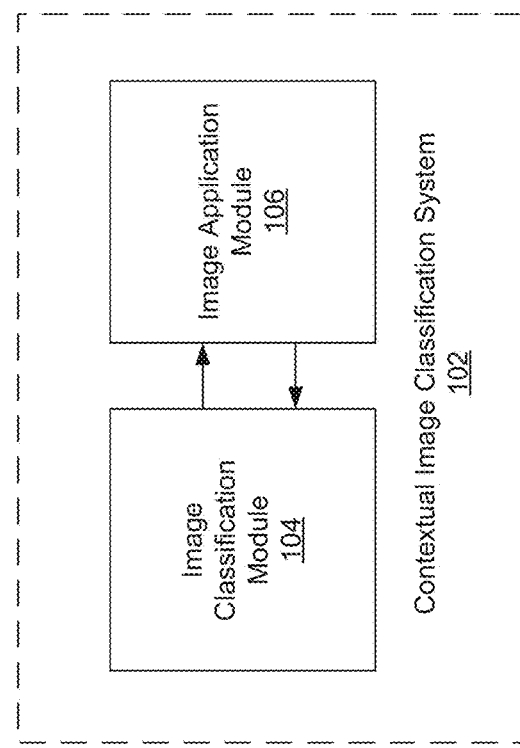
FIG. 1 shows an example of a contextual image classification system, in accordance with some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles described herein.

DETAILED DESCRIPTION

Image Classification by Correlating Contextual Cues

A social networking system may provide users with the ability to generate content and share it with friends. Users of a photo-sharing service of the social networking system may enjoy capturing images (e.g., still images, memes), video, or interactive content on their mobile phones and sharing the content with their online friends. Similarly, users may enjoy sharing content with their friends by, for example, updating interactive feeds on their homepage.

A social networking system may also provide or support the ability to indicate, identify, categorize, label, describe, or otherwise provide information about an item of content or attributes about the content. One way to indicate such information is through a tag that may identify or otherwise relate to subject matter of the content or its attributes. Another way to indicate such information is through global positioning system (GPS) coordinates of a user uploading content to identify the location of the upload, or where the content was captured. As described in more detail herein, there are many other ways to indicate information about content in social networking systems. Many such indicators, including tags (e.g., hashtag or other metadata tag) and GPS system coordinates, are nonvisual, and are not based on automated analysis of visual data in the content.

In certain circumstances, nonvisual indicators may be subjective or potentially misleading. For example, although the tags that a content generator chooses to apply to his or her own content may describe the subject matter of the content from the perspective of the content generator, the tags may be deemed misdescriptive or even irrelevant from the perspective of others. A user posting a picture of herself dressing up as Catwoman on Halloween, for instance, may tag the picture as a "#cat," even though the picture does not contain a domestic housecat. A user posting a picture of a dog named "Paris" may tag the picture with the tag "#paris," even though the picture does not depict Paris, France. A user posting images that he captured of his family at the Super Bowl in New Orleans on Super Bowl Sunday may have GPS coordinates and/or time stamps that indicate the images were captured at the Super Bowl, but the content of the images themselves may not relate to a football game.

Although the subjectivity of nonvisual indicators helps users of social networking systems to creatively express and share a rich variety of content, the subjectivity of nonvisual indicators often makes it difficult to search user-uploaded images, such as photographs. For instance, an attempt to search images posted to a social networking system for "cats" may reveal an image of a user in a Catwoman costume on Halloween. An attempt to perform a graphical search for images of the Eiffel Tower in Paris, France, may lead to images of a dog named "Paris." An attempt to search for Super Bowl photographs may reveal personal photographs of a fan's family that may not be highly relevant to someone looking for first-hand accounts a football game. In a sense, the nonvisual indicators associated with the images in these examples are "noisy" in that they may not accurately reflect the contents of the image they are associated with. It would be desirable to accurately search user-uploaded content in social networking systems.

FIG. 1 shows an example of a contextual image classification system 102, in accordance with some embodiments. The contextual image classification system 102 may be incorporated into a social networking system, an example of which is given in FIG. 11. In the example of FIG. 1, the contextual image classification system 102 may include an image classification module 104 and an image application module 106.

The image classification module 104 may recognize subject matter in content based on contextual cues associated with the content and visual attributes of the content. Content may include, for example, images, memes, video, interactive audiovisual material, etc. A visual attribute may include a visual pattern in an image or an image segment reflecting a characteristic property of subject matter depicted in content. Visual attributes may be based on one or a combination of, for example, appearance, color, shape, layout, etc.

A contextual cue may include a nonvisual indicator of the subject matter depicted in content. A contextual cue may reflect or suggest the subject matter of at least a portion of the content. In some embodiments, a contextual cue may comprise a content tag. Contextual cues may also include other types of nonvisual indicators of subject matter in the content, such as social cues. For instance, without limitation, the contextual cues may include: global positioning system (GPS) coordinates of the image or digital device of the user, the number of tags other than a specified tag, the extent to which a specified tag occurred in a series of tags, the order of a specified tag in a series of tags, the identity of a tagger of the content (e.g., an entity that associates characters strings with content), the identity of an uploader of the content (e.g., an entity that provides content for storage on a datastore of a social networking system), the identity of the owner of the content, the time of the content upload, connections and types of connections (e.g., friends) of the tagger (or the uploader or the owner), the status or profile of the tagger (or the uploader or the owner), metadata associated with the content, identities of people who view or like a given type of content, Exchangeable Image File (EXIF) information, etc.

In some embodiments, the image classification module 104 may train a classifier to recognize visual attributes of an image class based on contextual cues gathered from a sample set of images. A sample set of images may include a group of images from which a training set is selected to train the classifier. The sample set of images may include a large enough number of images to ensure an accurate outcome by the classifier. The classifier may assign each item of content a statistical score corresponding to the extent the content falls within a particular image class. In some embodiments, the classifier may incorporate a hierarchical classifier, a linear classifier, or other classifier. An example of a classifier is provided in FIG. 5. In some embodiments, the classifier may be trained initially based on a selected subset of images maintained by the social networking system. The classifier may be retrained under various circumstances. For example, the classifier may be retrained periodically at a selected frequency or non-periodically as images are made available to the classifier. As another example, the classifier may be retrained upon the occurrence of certain events, such as events (e.g., the Super Bowl) that are likely to cause a large number of images to be uploaded to the social networking system. As yet another example, the classifier may be retrained when the social networking system receives a threshold number of new images. Retraining in these and other circumstances can refine the ability of the classifier to recognize visual attributes of image classes.

An image class may include, for example, objects (e.g., a cat, car, person, purse, etc.), brands or objects associated with brands (e.g., Coca-Cola®, Ferrari®), professional sports teams (e.g., the Golden State Warriors®), locations (e.g., Mount Everest), activities (e.g., swimming), phrases or concepts (e.g., a red dress, happiness), and any other thing, action, or notion that can be associated with content. While many examples provided herein may refer to a single "image class," it is noted that the image class may refer to a plurality of image classes or one or more image classes comprising an amalgamation of objects, brands, professional sports teams, locations, etc.

In some embodiments, the image classification module 104 may use a trained classifier to compare visual attributes of an evaluation set of images with visual attributes of the image class and to determine whether visual attributes in an evaluation set of images can be sufficiently correlated with visual attributes of the image class. An evaluation set of images may include a group of images selected for classification by a classifier. In various embodiments, the evaluation set of images may include all or a portion of the images in a datastore, or all or a portion of the images in a social networking system. In an embodiment, the classifier may be trained by any suitable technique, such as machine learning.

In various embodiments, the image classification module 104 may provide classified content to the image application module 106. Classified content may include content that has been ranked and/or scored by a classifier. In contrast, raw content or unclassified content may include content that has not been ranked and/or scored by a classifier or otherwise associated with one or more image classes. The classified content may have a score that indicates the extent to which the classified content matches the image class. Higher scoring items of classified content may have higher degrees of correlation with the visual attributes of the image class. As a result, in various embodiments, the image classification module 104 may allow for efficient searching of the classified content based on the scoring.

Use of the classifier during analysis of an evaluation set of images for classification may occur at various times. For example, the classifier may analyze an evaluation set of images at a selected frequency or non-periodically as images are made available to the classifier. The classifier may also analyze an evaluation set of images upon the occurrence of certain events, such as events that are likely to cause a large number of images to be uploaded to the social networking system. The classifier may analyze an evaluation set of images when the social networking system receives a threshold number of new images. As yet another example, the classifier may analyze an evaluation set of images for classification before anticipated image searches are performed.

The image application module 106 may adapt the classified content for use in a social networking system. In some embodiments, the image application module 106 may interface with search application programming interfaces (APIs) to make each item of classified content searchable according to its image class. For example, the image application module 106 may interface with a search module that searches classified images that users have uploaded to a social networking system. As another example, the image application module 106 may interface with a search module that searches feeds of a social networking system for classified images or memes that users have posted to their feeds. The image application module 106 may also provide classified content in response to search queries. In some embodiments, the image application module 106 may extract topics associated with the classified images provided by the image classification module 104 using subject dictionaries, category trees, and topic tagging techniques.

Figure 2B:
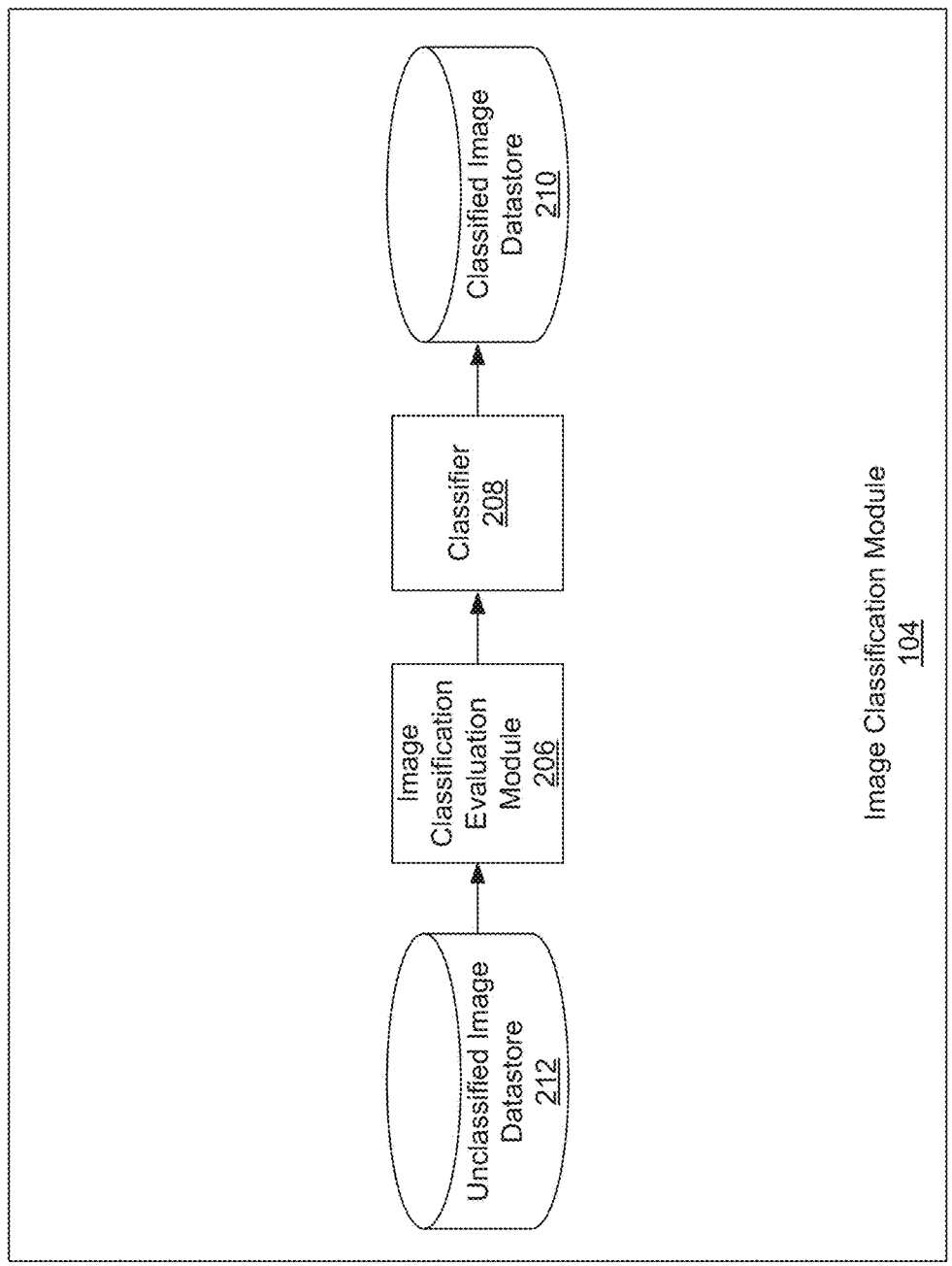
FIG. 2B shows an example of an image classification module, in accordance with some embodiments.

FIG. 2A shows an example of an image classification module 104, in accordance with some embodiments. The image classification module 104 may include an unclassified image datastore 202, an image classification training module 204, and a classifier 208. In addition to the components depicted in FIG. 2A, the image classification module 104 may also include the components depicted in FIG. 2B. It is noted that like elements in FIG. 2A and FIG. 2B may have like reference numerals.

The unclassified image datastore 202 may be coupled to the image classification training module 204 and the image classification evaluation module 206. The unclassified image datastore 202 may contain unclassified images. The unclassified images may have contextual cues associated with them. Datastores may include any organization of data, including tables, comma-separated values (CSV) files, traditional databases (e.g., SQL), or other known or convenient organizational formats. In some embodiments, the unclassified image datastore 202 may also store a set of contextual cues associated with images, such as tags or other cues. In some embodiments, the unclassified image datastore 202 may represent a portion or all of the unclassified images in a social networking system.

The image classification training module 204 may be coupled to the unclassified image datastore 202 and to the classifier 208. In some embodiments, the image classification training module 204 may implement a training phase. A training phase may include a phase of the image classification module 104 in which the image classification training module 204 trains the classifier 208 to recognize visual attributes of selected images from a sample set of images. During the training phase, the image classification training module 204 may obtain a sample set images from the unclassified image datastore 202. The image classification training module 204 may also gather a set of contextual cues associated with each obtained unclassified image. Based on the set of contextual cues, a training set of images selected from the sample set of images may be used to train the classifier 208 to recognize visual patterns. Unclassified images and/or contextual cues may be obtained by querying the unclassified image datastore 202 for the relevant information to determine the training set of images from the sample set of images.

During the training phase, the image classification training module 204 may be configured to specify one or more image classes with which to train the classifier 208. To specify the image class, the image classification training module 204 may receive automated input that defines the image class. Specifying the image class may also involve manual input from a person such as an administrator tasked with classifying images.

During the training phase, the image classification training module 204 may be configured to identify and select contextual cues that correspond to the image class. In various embodiments, the image classification training module 204 may evaluate the attributes of a particular image class and may determine whether certain contextual cues are likely associated with that image class. For example, the image classification training module 204 may determine that one type of tags is likely to accompany a photo of a domestic housecat, while another type of tags is likely to accompany a photo of a user in a Catwoman costume on Halloween. In such a case, the image classification training module 204 may select the type of tags that is likely to accompany a photo of a domestic housecat to correspond to the image class of a cat. As discussed in more detail herein, consideration of whether contextual cues apply to a particular image class may be based on many considerations, such as tags (e.g., the tag "#cat", the tag "#Halloween", etc.), the order of tags, whether particular tags are accompanied by other particular tags (e.g., whether the tag "#cat" is accompanied by the tag "#animal" or whether the tag "#cat" is accompanied by the tag "#Halloween"), etc. The image classification training module 204 may also be configured to rank and/or score the extent that the contextual cues associated with a particular image correspond to a particular image class.

The contextual cues are analyzed to identify a training set of images from the sample set of images. The training set of images represents images that are most closely correlated with an image class. During the training phase, the image classification training module 204 may provide the training set of images to the classifier 208 for identifying visual attributes associated with the image class. In some embodiments, the image classification training module 204 may instruct the classifier 208 to create a template of a visual pattern corresponding to a particular image class. In some embodiments, the image classification training module 204 may, if desired, store classified images and/or related visual pattern templates in a location such as the classified image datastore 210. The image classification training module 204 may further use manual annotators to help select the training set of images. The image classification training module 204 is further discussed in the context of FIG. 3 and FIG. 7.

The classifier 208 may be coupled to the image classification training module 204 and to a classified image datastore (e.g., the classified image datastore 210 shown in FIG. 2B). The classifier may receive images from the image classification training module 204. In the training phase, the classifier 208 may evaluate a training set of images for the presence of particular visual patterns. The classifier 208 may associate particular visual patterns with image classes, may create visual pattern templates, and may cause the visual pattern templates to be stored. In the training phase, the classifier 208 may return images used for training to the image classification training module 204. In some embodiments, the classifier 208 may include a return connection (e.g., via a feedback loop) to the image classification training module 204. As a result, the classifier 208 may assist the accuracy of the image classification training module 204. Such a return connection may assist improving future classification and training. The classifier 208 is further discussed in the context of FIG. 5.

FIG. 2B shows an example of an image classification module 104, in accordance with some embodiments. The image classification module 104 may include the unclassified image datastore 212, an image classification evaluation module 206, the classifier 208, and a classified image datastore 210. The unclassified image datastore 212 may be coupled to the image classification evaluation module 206. The unclassified image datastore 212 may store unclassified images. The unclassified image datastore 212 may, but need not, be the same as the unclassified image datastore 202, shown in FIG. 2A.

The image classification evaluation module 206 may be coupled to the unclassified image datastore 212 and to the classifier 208. In some embodiments, the image classification evaluation module 206 may implement an evaluation phase. An evaluation phase may include a phase of the image classification module 104 in which the image classification evaluation module 206 uses the classifier 208 to recognize visual patterns in an evaluation set of images. In an embodiment, the evaluation set of images may be selected from the unclassified image datastore 212.

During the evaluation phase, the image classification evaluation module 206 may provide the evaluation set of images from the unclassified image datastore 212 to the classifier 208. In various embodiments, the image classification training module 204 may have, in the training phase, trained the classifier 208 to recognize visual attributes of a training set of images associated with an image class. The evaluation set of images may comprise a different set of images than the sample set of images and the training set of images. In some embodiments, the image classification evaluation module 206 may also provide the classifier 208 with an image class that the classifier 208 is to compare the evaluation set of images with. In various embodiments, the image classification evaluation module 206 may instruct the classifier 208 to rank and/or score the evaluation set of images based on correlation with the image class. The image classification evaluation module 206 may also store ranking and scoring of images (i.e., images that have been scored based on correlation with the image class) in the classified image datastore 210. The image classification evaluation module 206 is further discussed in the context of FIGS. 4 and 8.

The classifier 208 may be coupled to the image classification training module 204 and the image classification evaluation module 206. The classifier 208 may receive images from the image classification evaluation module 206. In the evaluation phase, the classifier 208 may perform visual pattern recognition on an evaluation set of images to score the correlation between each image and visual pattern templates associated with an image class of interest. In the evaluation phase, the classifier 208 may return images used in evaluation to the image classification evaluation module 206. The classifier 208 is further discussed in the context of FIG. 5.

The classified image datastore 210 may be coupled to the classifier 208 and the image application module 106. The classified image datastore 210 may store information including classified images, image classes, visual pattern templates, and other information. In some embodiments, the classified image datastore 210 may be indexed to facilitate efficient searches of classified images by APIs seeking access to classified images. For instance, the classified image datastore 210 may be configured to be compatible with a search module coupled to the image application module 106 that seeks to access classified images.

Figure 3:
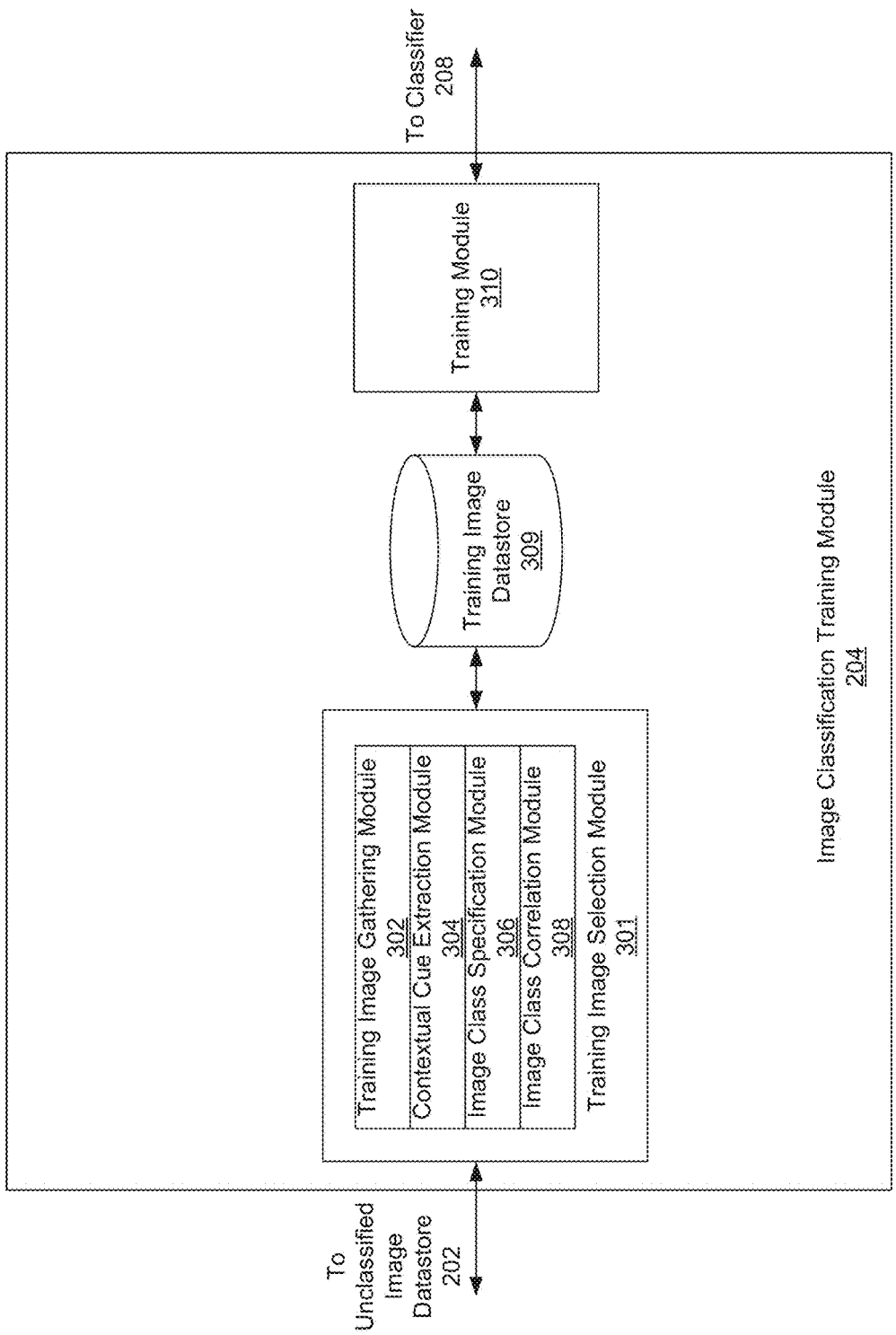
FIG. 3 shows an example of an image classification training module, in accordance with some embodiments.

FIG. 3 shows an example of an image classification training module 204, in accordance with some embodiments. The image classification training module 204 may include a training image selection module 301, a training image datastore 309, and a classifier training module 310.

The training image selection module 301 may be coupled to the unclassified image datastore 202 and to the training image datastore 309. The training image selection module 301 may identify a training set of images from the sample set of images. The training image selection module 301 may also store the training set of images in the training image datastore 309. The training image selection module 301 may include a training image gathering module 302, contextual cue extraction module 304, an image class specification module 306, and an image class correlation module 308.

The training image gathering module 302 may be coupled to the other modules of the training image selection module 301. In some embodiments, the training image gathering module 302 may gather a sample set of images along with contextual cues associated with the sample set of images. The sample set of images and associated contextual cues may be retrieved from the unclassified image datastore 202.

The contextual cue extraction module 304 may be coupled to the other modules of the training image selection module 301. The contextual cue extraction module 304 may be configured to extract the contextual cues associated with the sample set of images. As discussed herein, the contextual cues may include nonvisual indicators of the contents of an image. Examples of contextual cues for an image may include image tags for the image, GPS coordinates of a device capturing the image, the identities of the tagger, uploader, and owner of the image, the identities of the owners of the image, other information directly or indirectly related to the image, etc. In some embodiments, the contextual cue extraction module 304 may provide the image class correlation module 308 with the set of contextual cues so that the image class correlation module 308 may correlate the contextual cues with an image class.

The image class specification module 306 may be coupled to the other modules of the training image selection module 301. The image class specification module 306 may be configured to specify an image class that the classifier 208 is trained to recognize. In some embodiments, the image class specification module 306 may receive an instruction to specify the image class from an administrator, which may be human or automated. In various embodiments, specifying of an image class may involve creating an image class if one does not exist, or designating an image class if such an image class does exist.

The image class correlation module 308 may be coupled to the other modules of the training image selection module 301. The image class correlation module 308 may receive one or more of the sample set of images, along with associated contextual cues, from the contextual cue extraction module 304, and may receive a specified image class from the image class specification module 306. The image class correlation module 308 may determine the extent to which the contextual cues of a particular image will correlate with a specific image class. More specifically, the image class correlation module 308 may assign to each of the images a score or value that indicates the probability a given image correlates with the image class. In some embodiments, the image class correlation module 308 may also rank each of the sample set of images based on the score of each image. In some embodiments, the image class correlation module 308 may select a training set from the sample set of images, such as the highest scoring images of the sample set of images, to provide to the classifier training module 310. Advantageously, the image class correlation module 308 need not perform any visual recognition of the content in the sample set of images.

The following discussion provides examples of how the image class correlation module 308 may determine the likely contents of images based on contextual cues associated with the images. As provided in the following discussion, the image class correlation module 308 may analyze the tags themselves, the syntax of tags, or may perform other types of analyses on the contextual cues extracted by the contextual cue extraction module 304. The image class correlation module 308 may also provide any combination of the following examples to correlate, based on the contextual cues, the sample set of images with a specified image class to determine a training set of images.

In some embodiments, the image class correlation module 308 may analyze the syntax of image tags of the sample set of images. The image class correlation module 308 may determine how likely a specific syntax correlates with a given image class. In some embodiments, syntactical analysis of the image tags may involve assigning weights to the exact language of the image tags. That is, the image class correlation module 308 may determine that the exact wording of tags associated with an image indicates that the tags should be correlated with an image class. For instance, an image may be tagged with the image tag "#domestic housecat." The image class correlation module 308 may determine that a tag "#domestic housecat" correlates to a high degree with an image class for images of domestic housecats. As another example, the image class correlation module 308 may determine that a tag "#domestic house market" correlates to a low degree with the image class for domestic housecats.

The image class correlation module 308 may also analyze the order of a particular image tag in a series of image tags associated with an image. For instance, a person seeking to tag a photo of a domestic housecat may include the following series of tags: "#cat, #athome, #Sunday, #animal." The image class correlation module 308 may identify that the tag "#cat" is the first tag in the series of tags, and therefore, that the image is likely an image of a domestic housecat. The image class correlation module 308 may assign the series of tags a weight in correlating the image to the image class. It is noted that, to correlate an image with an image class, the image class correlation module 308 may also account for tags at positions other than the first position in a series of tags.

The image class correlation module 308 may also analyze whether a plurality of image tags are synonymous with one another. For instance, suppose a first image was tagged as follows: "#cat, #athome, #Halloween, #Catwoman, #costume, #DC Comics®." Suppose further that a second image was tagged as follows: "#cat, #mammal, #animal, #housecat, #tomcat, #feline, #cute." The image class correlation module 308 may determine, based on some of the tags of the first image, that the series of tags are not synonymous with one another, and that the first image is not likely to contain an image of a domestic housecat. The image class correlation module 308 may further determine, based on some of the tags of the second image, that the series of tags are synonymous (e.g., "cat," "tomcat," and "feline"), and that the second image is more likely than the first image to contain an image of a domestic housecat. Accordingly, the image class correlation module 308 may assign a score for the second image higher than the score of the first image with respect to the image class of domestic housecats.

In some embodiments, the image class correlation module 308 may evaluate a plurality of image tags for the absence of an antonym or divergent meanings. For instance, suppose a first image was tagged as follows: "#blackcar," "#whitecar," "#luxurycar," "#My Mercedes." Suppose a second image was tagged as follows: "#blackcar," "#darkcar," "#luxurycar," "#My Mercedes." The image class correlation module 308 may determine, based on the fact that the second series of tags lacks an antonym for the "blackcar," that the second image correlated to a high degree with an image class corresponding to a black car. The image class correlation module 308 may assign a score for the second image greater than a score for the first image with respect to the image class of black cars.

The image class correlation module 308 may, in some embodiments, evaluate the relationship of an image tag based on an ontology or a language hierarchy. For example, the image class correlation module 308 may develop an ontology of one or more words from an online source (e.g., WordNet), and may locate words with emotional impact (e.g., "happy," "sad," red dress," "black car"). As another example, suppose an image were tagged as follows: "#cat, #mammal, #animal, #housecat, #tomcat, #feline, #cute." The image class correlation module 308 may determine that the "cat" is a part of the family of items identified by "mammal," which in turn is part of the family of items identified by "animal." As a result, the image class correlation module 308 may, in such an example, identify the tags as providing a reliable indicator of a domestic housecat depicted in the image. The image class correlation module 308 may then score the image accordingly with respect to the image class of domestic housecats.

In various embodiments, the image class correlation module 308 may perform other natural language analysis of tag words and phrases. In some embodiments, the image class correlation module 308 may account for misspellings of tag words. The image class correlation module 308 may also account for languages other than English, including looking for the presence of non-English words in conjunction with English counterparts (e.g., "#cat" and "#gato" in the same series of tags). In each of these examples, the image class correlation module 308 may score a set of images appropriately with respect to a particular image class.

In addition to analyzing the syntax of image tags, the image class correlation module 308 may analyze social cues related to image generation and/or tagging. For instance, image class correlation module 308 may analyze locational data associated with the sample set of images. More specifically, the image class correlation module 308 may evaluate the GPS coordinates of an image. For example, the GPS coordinates may be taken from a GPS transceiver on a user's mobile device, or may be taken from geographical tagging of the image when or after the image is uploaded. Using the locational data of a particular image, the image class correlation module 308 may assign a score to the particular image with respect to a specific image class. For instance, the image class correlation module 308 may determine from locational data that an image was taken near the Golden Gate Bridge in San Francisco. The image class correlation module 308 may then assign a score to the image with respect to an image class of bridges.

In some embodiments, the image class correlation module 308 may analyze social cues that include the identity of the generator of a particular image of the sample set of images. The image class correlation module 308 may assign scores depending on whether particular entities are likely to generate images in a particular image class. For example, if an entity historically has generated many images in a particular image class, the image class correlation module 308 may score a particular image of the entity to reflect a high degree of correlation with the image class.

In some embodiments, the image class correlation module 308 may analyze social cues that indicate whether the owner of one of the sample set of images was the generator of the image or a tagger of the image. In some embodiments, the image class correlation module 308 may determine whether the entity that owns an image or intellectual property rights to the image generated or tagged the image. For instance, with respect to an image class of a trademark (e.g., a Coca-Cola® logo), the image class correlation module 308 may provide an image a score reflecting a high degree of correlation if the image was generated or tagged by the entity that owns the trademark (e.g., the Coca-Cola® company). Such a weighting scheme may prove particularly advantageous to recognizing trademarked images or logos.

In some embodiments, the image class correlation module 308 may analyze social cues that indicate the status or a profile of a person in a social networking system. The person may be a generator and/or tagger of a particular image of the sample set of images. For instance, the image class correlation module 308 may determine, based on the person's activities (e.g., past posts, status updates, friendships, messaging history, past tagging history, past image generating history, browsing history, online profile, etc.), or relationships (e.g., friends), whether the person is likely to be a reliable image generator and/or tagger. The image class correlation module 308 may assign various scores to one or more images based on whether the person's status or profile indicates the person to be a reliable image generator and/or tagger either in general or with respect to an image class in particular.

In various embodiments, the image class correlation module 308 may analyze social cues that indicate the presence or absence of other image classes. For instance, the image class correlation module 308 may determine that an image includes a boat, and, as a result, that the image is unlikely to be indoors. The presence of contextual cues (e.g., a hashtag "#indoors") may indicate that the image is unlikely to contain a boat. As another example, the image class correlation module 308 may determine that the presence of one object in an image may mean that another object may or may not be present in the image. For instance, the presence of contextual cues that indicate cows in the image may allow the image class correlation module 308 to provide a negative correlation for airplanes, given the fact that the image is unlikely to contain both cows and airplanes. As another example, the presence of one contextual cue that indicates one chicken in an image may allow the image class correlation module 308 to provide a positive correlation for other chickens in the image, given the fact that an image containing one chicken is likely to contain other chickens. Likewise, the presence of sheep may indicate a positive correlation for a sheepdog.

The image class correlation module 308 may analyze a variety of social cues, including but not limited to those discussed above and one or more of: whether the uploader is the owner of the image, the file type of the image, metadata in or associated with the image, the identity of likers of an image, the sophistication or experience of users who have viewed a tag or image, whether the image has been previously classified in an image class (and if so, what the score of the image was with respect to that image class), etc. Other social clues, apart from those expressly discussed herein, may be analyzed by the image class correlation module 308 to correlate and score images with an image class. The image class correlation module 308 may assign various scores to various images based on the extent the contextual cues of these images correlate to a high degree with one or more image classes.

In addition to assigning scores to the images, the image class correlation module 308 may also rank the sample set of images with respect to one or more image classes. For instance, the image class correlation module 308 may rank each image of the sample set of images based on the score of each image with respect to an image class. The ranking may reflect the relative correlation of each image with the image class. The image class correlation module 308 may use the weights, scores, and/or ranks to generate the training set of images.

The training image datastore 309 may receive the training set of images from the training image selection module 301. The training image datastore 309 may store the training set of images. In some embodiments, the training image datastore 309 may allow the classifier training module 310 to access the training set of images.

The classifier training module 310 may be coupled to the training image datastore 309 and to the classifier 208. In various embodiments, the classifier training module 310 may provide the training set of images to train the classifier 208 to recognize an image class. The training set of images may be limited to a threshold number of the highest ranked images of the sample set with respect to a particular image class. The threshold number of the highest ranked images may be represented by a value K, where K is any integer value. For instance, suppose the training image gathering module 302 gathered 1000 images as the sample set of images for ultimately training the classifier 208 to recognize an image class for "domestic housecats." Suppose further that the image class correlation module 308 assigned scores to 200 of these images that were higher than the scores assigned to the remaining 800 images. In such a case, the classifier training module 310 may provide only the 200 top scoring images to the classifier 208 as the training set of images so that the classifier 208 can efficiently determine the visual attributes of images correlating highly with the image class for domestic housecats.

Figure 4:
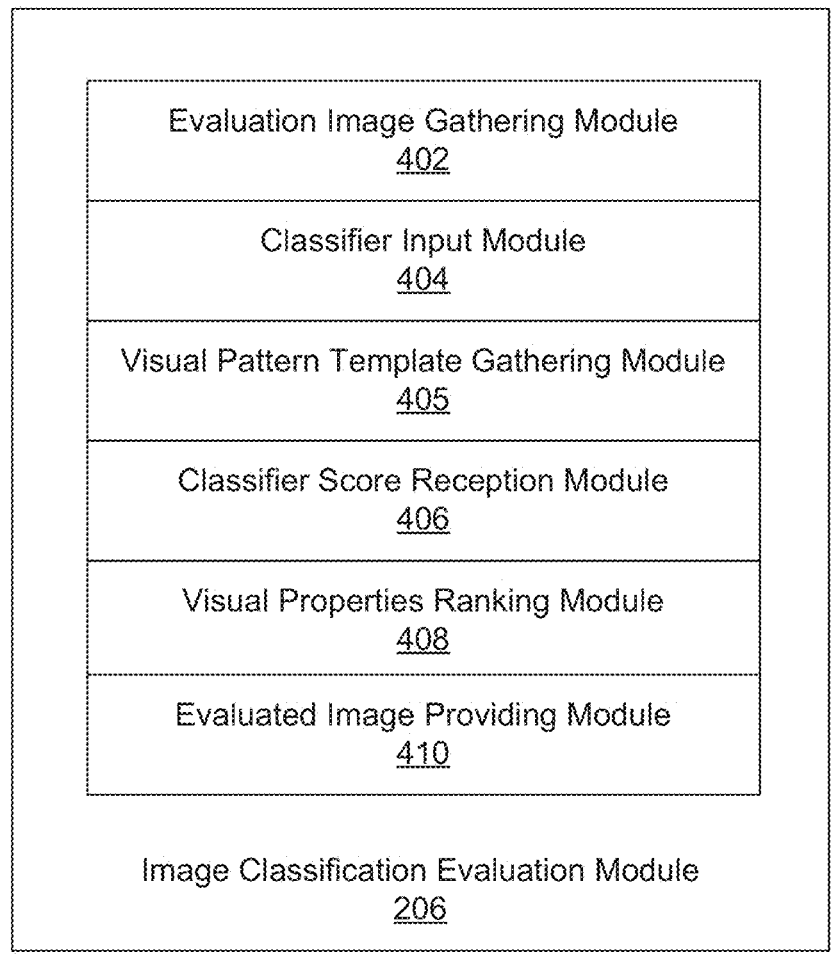
FIG. 4 shows an example of an image classification evaluation module, in accordance with some embodiments.

FIG. 4 shows an example of an image classification evaluation module 206, in accordance with some embodiments. The image classification evaluation module 206 may include an evaluation image gathering module 402, a classifier input module 404, a visual pattern template gathering module 405, a classifier score reception module 406, a visual properties ranking module 408, and an evaluated image providing module 410.

The evaluation image gathering module 402 may be coupled to the other modules of the image classification evaluation module 206. In some embodiments, the evaluation image gathering module 402 may gather an evaluation set of images for image classification from the unclassified image datastore 202. The evaluation set of images may be the same or different from the sample set of images and the training set of images. The evaluation set of images may comprise a different number of images (e.g., a larger number of images) than the sample set of images and the training set of images. In various embodiments, the evaluation set of images may be obtained randomly or selectively from the unclassified image datastore 202.

The visual pattern template gathering module 405 may be coupled to the other modules of the image classification evaluation module 206 and to the image classification training module 204. In some embodiments, the visual pattern template gathering module 405 may receive from the image classification training module 204 visual pattern templates that correspond to a particular image class. The visual pattern template gathering module 405 may further provide visual pattern templates to the classifier input module 404.

The classifier input module 404 may be coupled to the other modules of the image classification evaluation module 206. In some embodiments, the classifier input module 404 may receive from the evaluation image gathering module 402 the evaluation set of images. The classifier input module 404 may also receive from the visual pattern template gathering module 405 a visual pattern template that corresponds to a particular image class. The classifier input module 404 may instruct the classifier 208 to attempt to recognize the visual pattern template in each of the evaluation set of images.

The classifier score reception module 406 may be coupled to the other modules of the image classification evaluation module 206. In some embodiments, the classifier score reception module 406 may receive from the classifier 208 scores that indicate the extent to which particular images of the evaluation set of images correlate with the visual pattern template.

The visual properties ranking module 408 may be coupled to the other modules of the image classification evaluation module 206. In various embodiments, the visual properties ranking module 408 may rank the evaluation set of images based on the extent to which the scores of each of the evaluation set of images correlates with the visual pattern template. In some embodiments, the visual properties ranking module 408 may provide a re-ranked set of images, which constitute a classified set of images for indexing or searching.

The evaluated image providing module 410 may be coupled to the other modules of the image classification evaluation module 206. In some embodiments, the evaluated image providing module 410 may receive the re-ranked or classified images from the visual properties ranking module 408. The evaluated image providing module 410 may provide the re-ranked images to the classified image datastore 210 along with an index or other information that reflects the extent each re-ranked image correlates with a specified image class.

Figure 5:
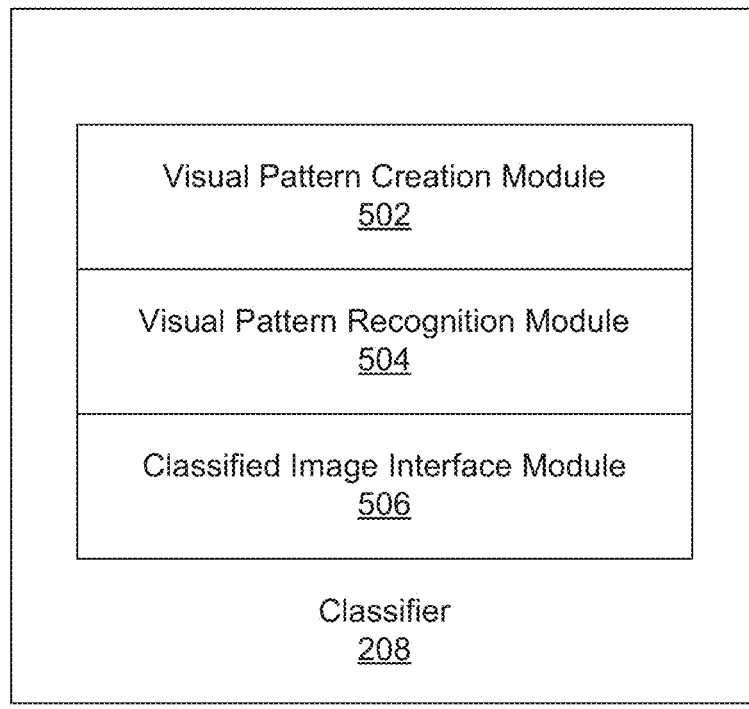
FIG. 5 shows an example of a classifier, in accordance with some embodiments.

FIG. 5 shows an example of a classifier 208, in accordance with some embodiments. The classifier 208 may include a visual pattern creation module 502, a visual pattern recognition module 504, and a classified image interface module 506.

The visual pattern creation module 502 may be coupled to the visual pattern recognition module 504. The visual pattern creation module 502 may receive, during the training phase of the classifier 208, a training set of images from the image classification training module 204, and create a visual pattern template of features that are common to the training set of images associated with the image class. To create the visual pattern template, the visual pattern creation module 502 may implement a visual pattern recognition algorithm, such as a bag-of-words model in computer vision or technique that counts the occurrence of a vocabulary of local image features in each of the training set of images. In an embodiment, the visual pattern creation module 502 may break up an image into segments, and may evaluate each segment of the image for the presence of visual features. The visual pattern creation module 502 may further extract the visual features identified in each segment of the image and may represent the visual features as vectors. Using the vectors, the visual pattern creation module 502 may create a visual pattern template of features that are common to the training set of images.

In various embodiments, the visual pattern creation module 502 may create a visual pattern template based on the features that are most commonly found in the training set of images. For instance, in these embodiments, the image classification training module 204 may provide the visual pattern creation module 502 with an integer "K" number of images, and the visual pattern creation module 502 may recognize features that are most commonly found in the K images.

The visual pattern recognition module 504 may be coupled to the visual pattern creation module 502. The visual pattern recognition module 504 may receive, during the evaluation phase, an evaluation set of images from the image classification evaluation module 206, and may identify the extent to which each of the evaluation set of images correlates with a particular visual pattern template associated with an image class. In some embodiments, the visual pattern recognition module 504 may employ visual pattern recognition, such as a bag of words algorithm. The visual pattern recognition may comprise a neural network image classification technique, in some embodiments. The visual pattern recognition module 504 may determine the various visual features within the evaluation set of images, and for each image, represent extracted visual features as a set of vectors. The visual pattern recognition module 504 may also compare the vectors for each of the evaluation set of images with various visual pattern templates of features. In some embodiments, the visual pattern recognition module 504 may score the extent to which each of the evaluation set of images correlates with the various visual pattern templates generated during the training phase.

The classified image interface module 506 may be coupled to the visual pattern creation module 502 and the visual pattern recognition module 504. In some embodiments, the classified image interface module 506 may receive classified images, along with their scores, from the visual pattern recognition module 504. The classified image interface module 506 may provide the classified images and/or the scores to the classified image datastore 210. The classified image interface module 506 may also provide visual pattern templates to the classified image datastore 210.

Figure 6:
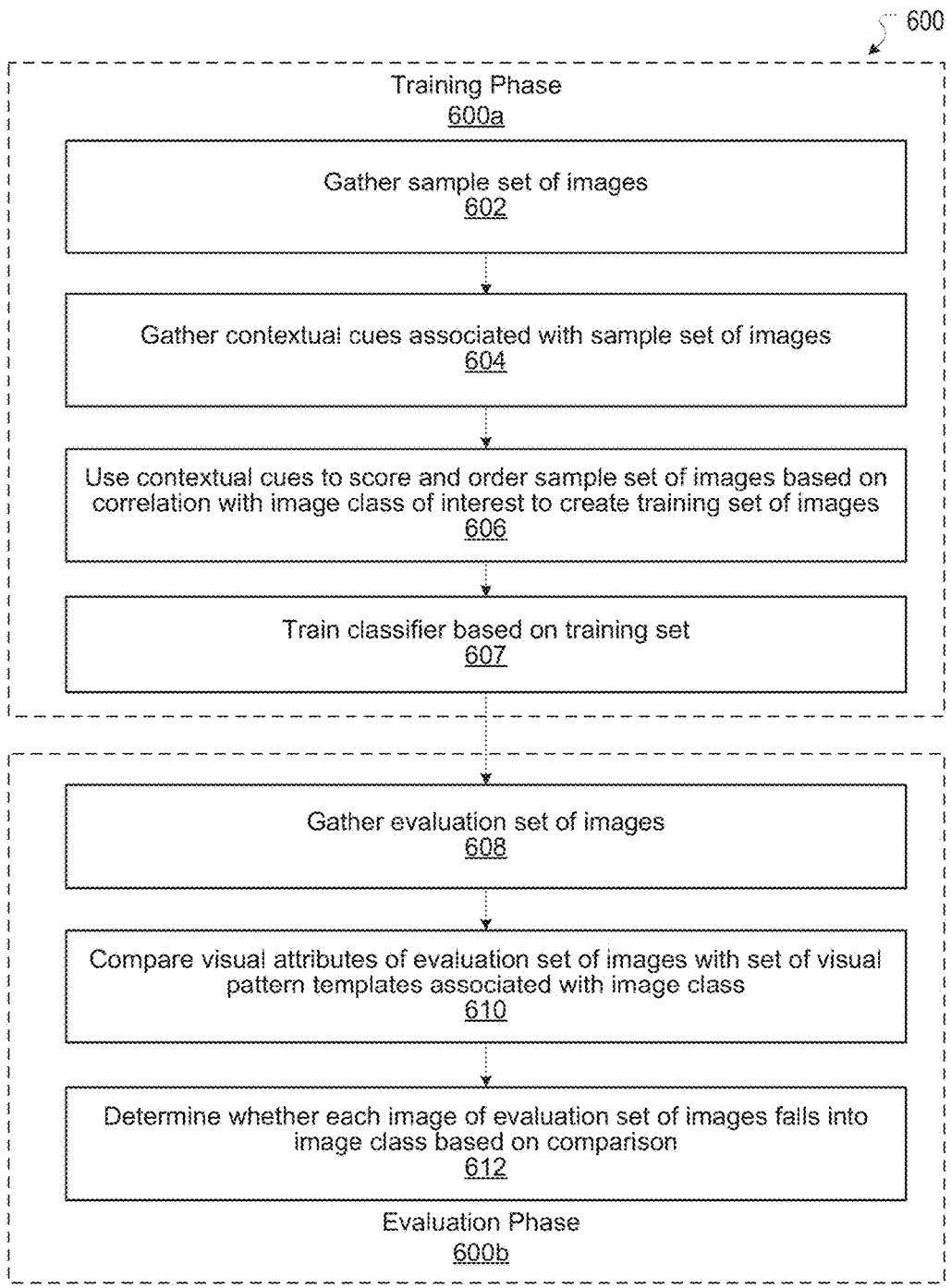
FIG. 6 shows an example of a process for classifying images, in accordance with some embodiments.

FIG. 6 shows an example of a process 600 for classifying images, in accordance with some embodiments. The process 600 is discussed in conjunction with the image classification module 104 shown in FIG. 2A. The process 600 may include a training phase 600*a* and an evaluation phase 600*b*. At block 602 of the process 600, the image classification training module 204 may gather a sample set of images from the unclassified image datastore 202. At block 604, the image classification training module 204 may gather contextual cues associated with the sample set of images. At block 606, the image classification training module 204 may use the contextual cues to score and order the images based on their correlation with an image class of interest to create a training set of images, as discussed herein. Based on the scoring and ordering, a training set of images may be determined. At block 607, the image classification training module 204 may train the classifier 208 based on the training set. At block 608, the image classification evaluation module 206 may gather an evaluation set of images from the unclassified image datastore 202. At block 610, the classifier 208 may compare visual attributes of the evaluation set of images with a set of visual pattern templates associated with the image class. At block 612, the classifier 208 may determine whether each image of the evaluation set of images falls into the image class based on the comparison.

Figure 7:
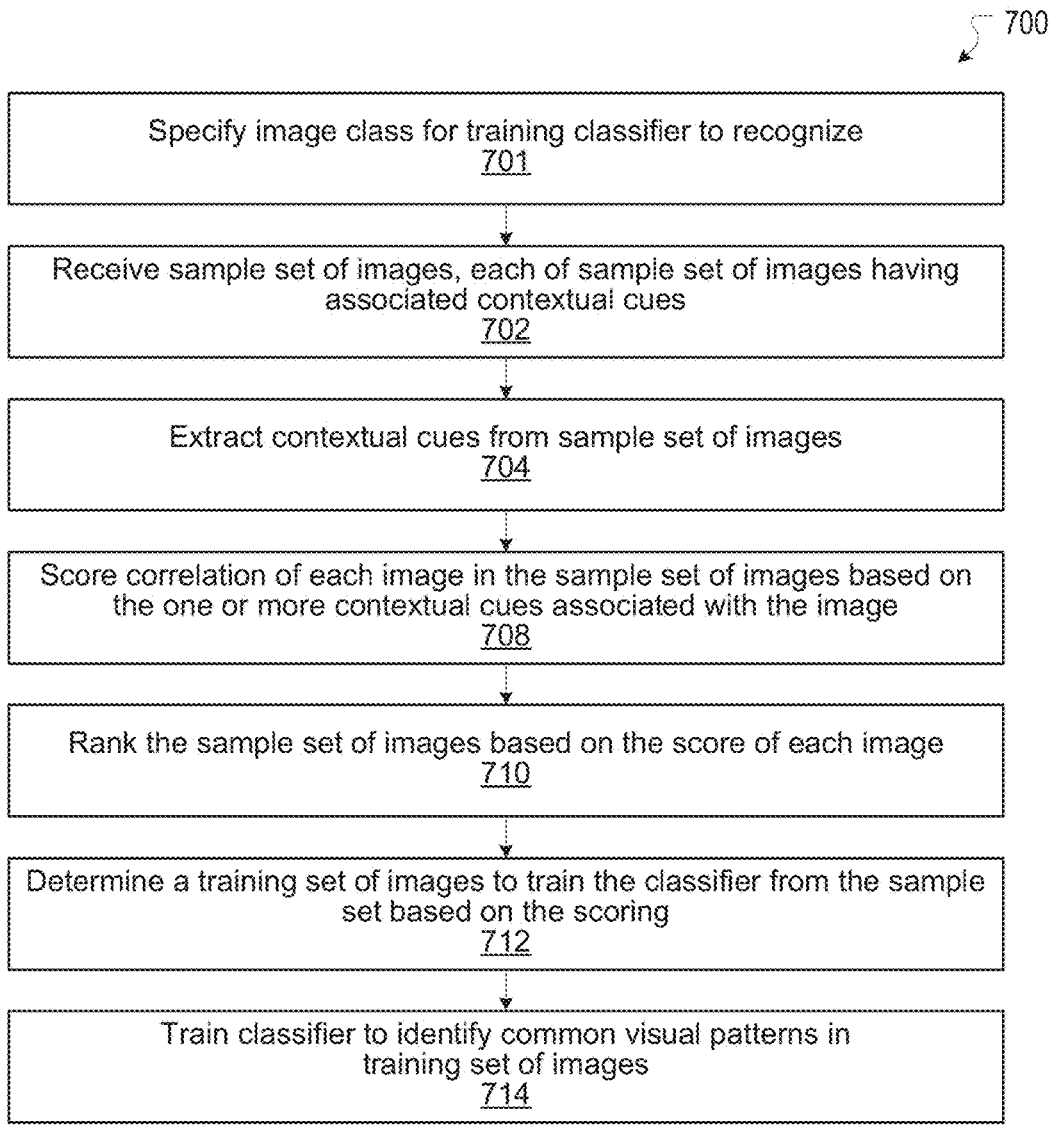
FIG. 7 shows an example of a process for training a classifier, in accordance with some embodiments.

FIG. 7 shows an example of a process 700 for training a classifier, in accordance with some embodiments. The process 700 is discussed in conjunction with the image classification training module 204 shown in FIG. 3. At block 701, the image class specification module 306 may specify an image class for training the classifier 208 to recognize. At block 702, the training image gathering module 302 may receive a sample set of images, each of the sample set of images having associated contextual cues. At block 704, the contextual cue extraction module 304 may extract the contextual cues from the sample set of images. At block 708, the image class correlation module 308 may score correlation of each image in the sample set of images with the image class based on the one or more contextual cues associated with the image. At block 710, the image class correlation module 308 may rank the sample set of images based on the score of each image. At block 712, the image class correlation module 308 may determine a training set of images from the sample set to train the classifier 208. In some embodiments, the determination of a training set may comprise ranking each image in the sample set based on the scoring. The determination may also comprise selecting a top scoring subset of the sample set of images. The top scoring subset may comprise the training set of images. At block 714, the classifier training module 310 may train the classifier 208 to identify common visual patterns in the training set of images.

Figure 8:
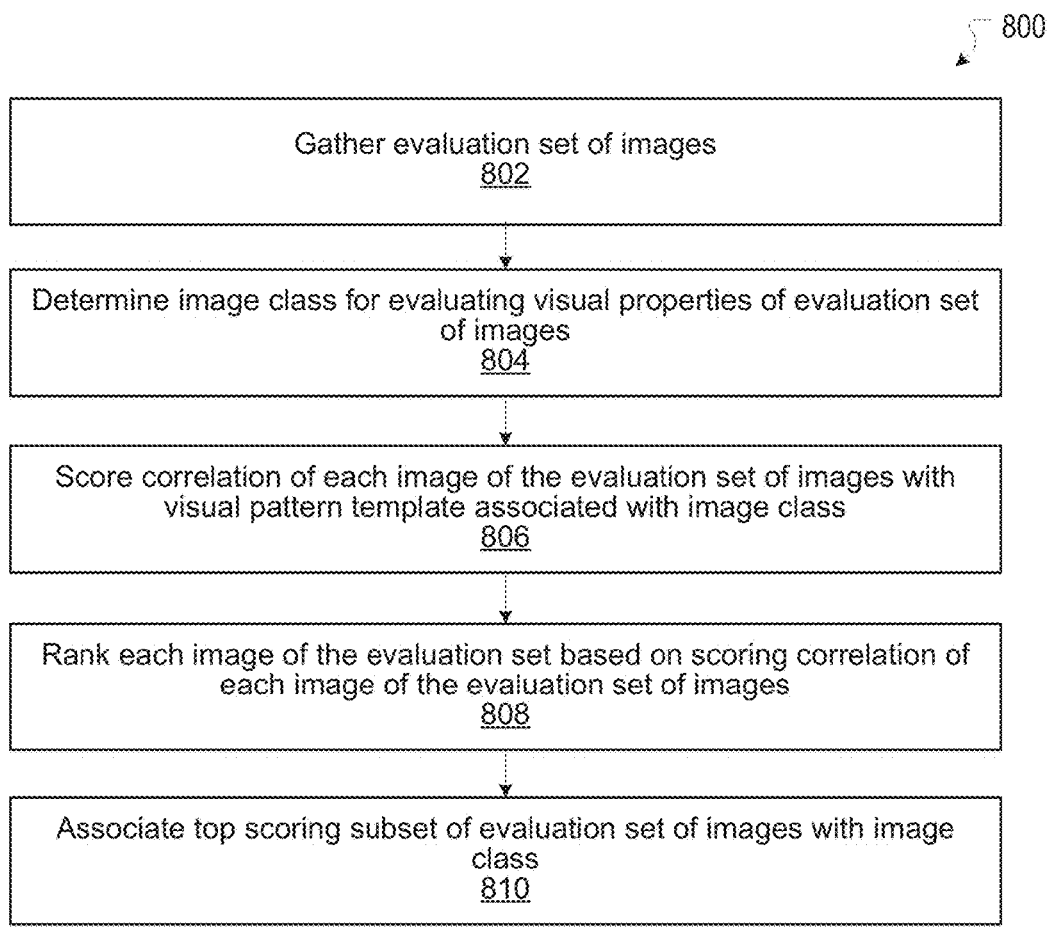
FIG. 8 shows an example of a process for classifying images, in accordance with some embodiments.

FIG. 8 shows an example of a process 800 for classifying images, in accordance with some embodiments. The process 800 is discussed in conjunction with the image classification evaluation module 206 shown in FIG. 4, and the classifier 208 shown in FIG. 5. At block 802, the evaluation image gathering module 402 may gather an evaluation set of images from the unclassified image datastore 202. At block 804, the evaluation image gathering module 402 may determine an image class for evaluating visual properties of the evaluation set of images. In some embodiments, the classifier input module 404 may provide the evaluation set of images and the image class to the classifier 208. At block 806, the visual pattern recognition module 504 may score correlation of each image of the evaluation set of images with a visual pattern template associated with the image class. At block 808, the visual pattern recognition module 504 may rank each image of the evaluation set of images based on the scored correlation of each image of the evaluation set of images. At block 810, the visual pattern recognition module 504 may associate a top scoring subset of the evaluation set of images with the image class. In some embodiments, the classified image interface module 506 may then provide the top scoring subset to various other modules in a social networking system.

Figure 9:
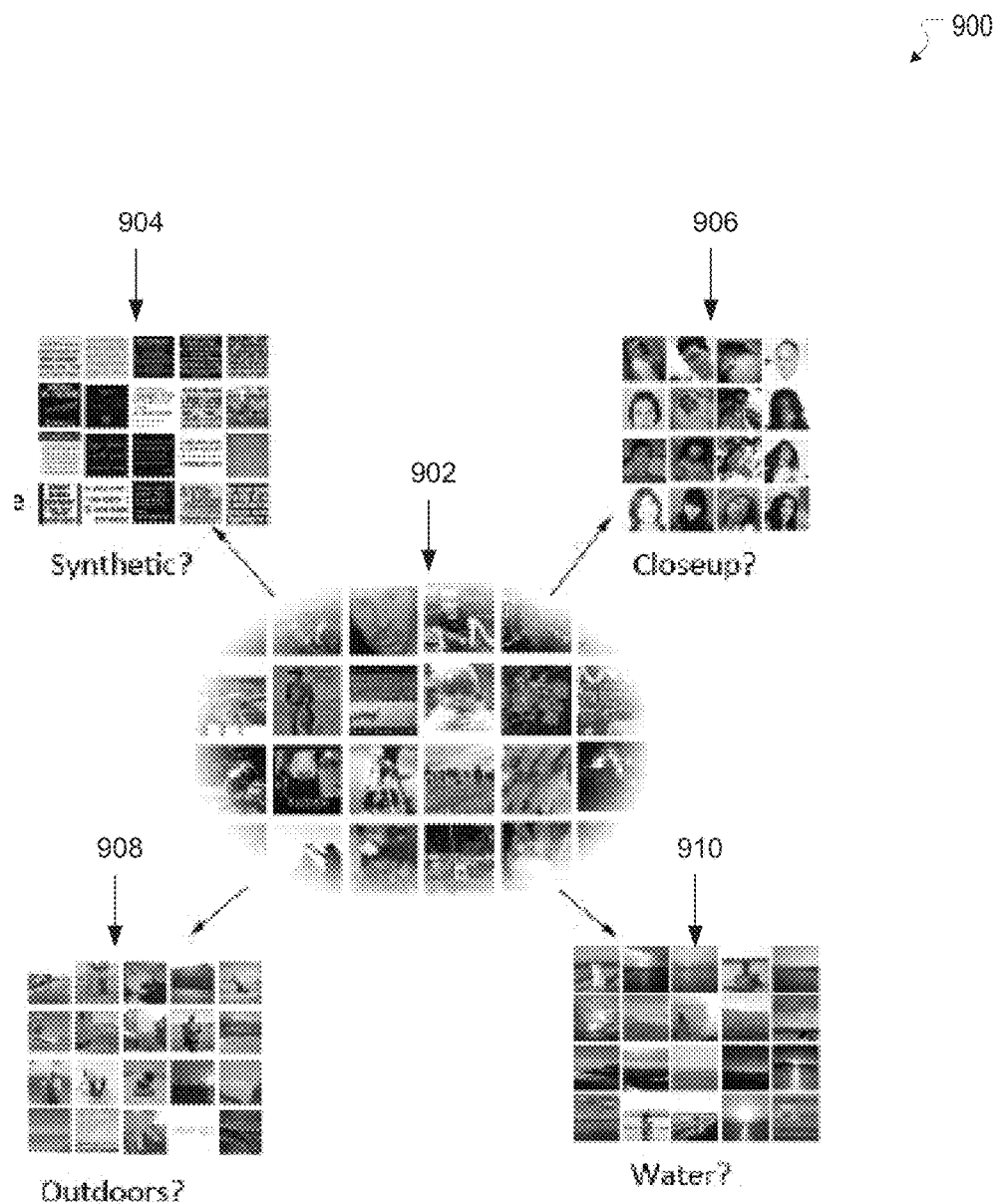
FIG. 9 shows an example of a preview of contextually generated image filters applied to a group of images, in accordance with some embodiments.

FIG. 9 shows an example of a preview 900 of a contextually generated classification of a group of images by the image classification module 104, in accordance with some embodiments. The preview 900 includes an unclassified group of images 902, a first classified group of images 904, a second classified group of images 906, a third classified group of images 908, and a fourth classified group of images 910. In the example of FIG. 9, the unclassified group of images 902 includes a group of images having contextual cues associated with them. The contextual cues may include image tags and other contextual information. To produce the first classified group of images 904, second classified group of images 906, the third classified group of images 908, and the fourth classified group of images 910, one or more of the unclassified group of images 902 has been provided to the image classification training module 204. The image classification training module 204 has, during a training phase, used sets of the unclassified group of images 902, sorted based on contextual cues, to train the classifier 208 to recognize visual attributes associated with four image classes, namely: a first image class of images having a synthetic look/feel, a second image class of close-up images, a third image class of images taken outdoors, and a fourth image class of images depicting water. The image classification evaluation module 206 has, during an evaluation phase, provided the unclassified group of images 902 to the classifier 208 which has been trained to compare visual attributes of the unclassified group of images 902 with visual pattern templates associated with the four image classes. The outputs of the classifier 208 have corresponded to the four image classes that the classifier 208 was trained to recognize. More specifically, the classifier 208 has produced the first classified group of images 904, corresponding to the first image class; the second classified group of images 906, corresponding to the second image class; the third classified group of images 908, corresponding to the third image class; and the fourth classified group of images 910, corresponding to the fourth image class.

Figure 10:
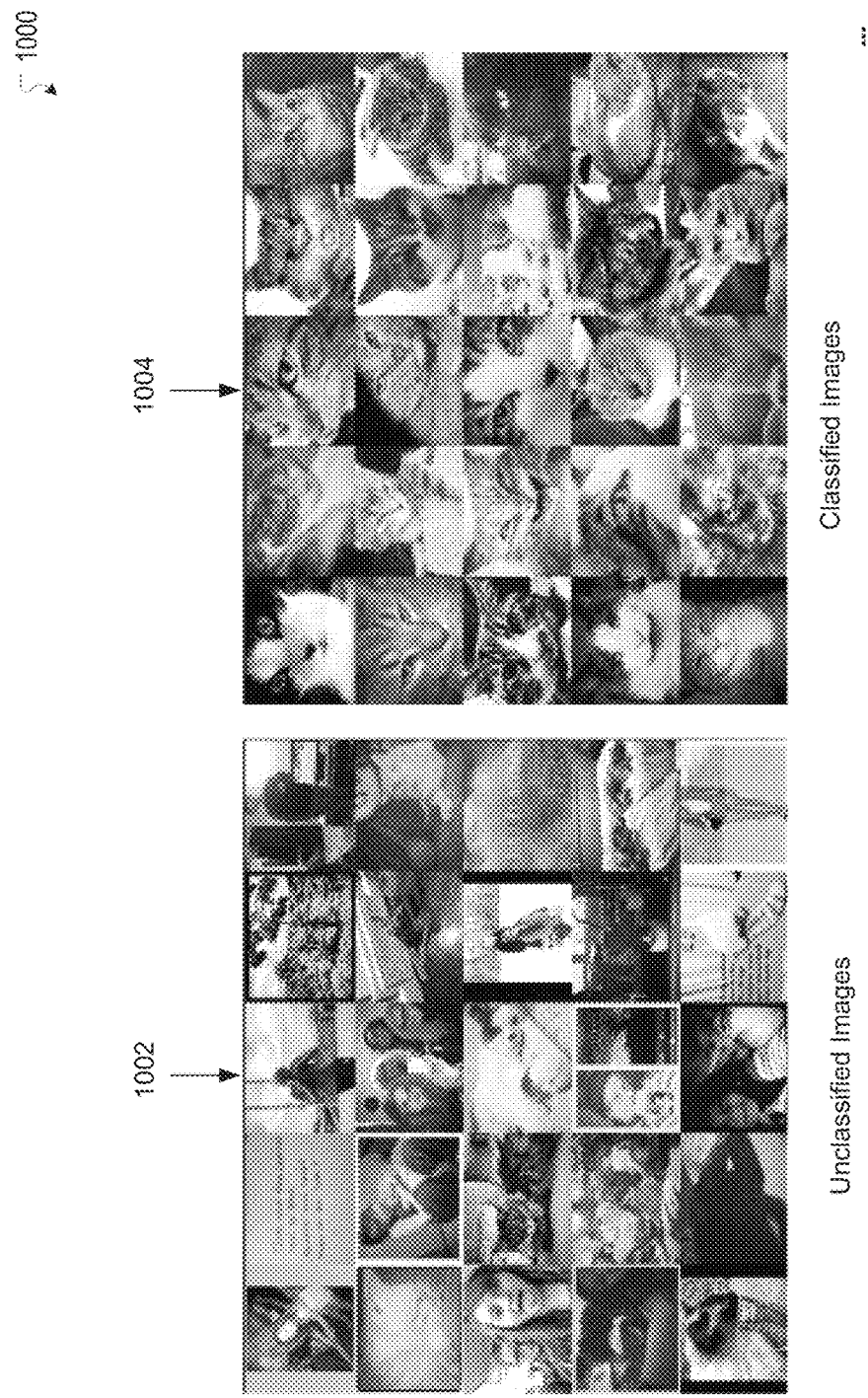
FIG. 10 shows an example of a preview of a contextually generated image filter applied to a group of images, in accordance with some embodiments.

FIG. 10 shows an example of a preview 1000 of a contextually generated image filter classification of a group of images by the image classification module 104, in accordance with some embodiments. The preview 1000 includes an unclassified group of images 1002 and a classified group of images 1004. The unclassified group of images 1002 may represent a portion of unclassified images in a social networking system. A sample set of images was associated with tags and other contextual cues. Based on its contextual cues, each image of the sample set of images was scored based on its correlation with an image class of interest. In this example, "cat" is the image class of interest. The images of the sample set of images then were ranked based on their scores. In this example, the highest ranking 200 images of the sample set of images were designated as a training set of images. The training set of images was then applied to train a classifier to recognize common visual patterns depicted in the images. Visual pattern templates were generated based on the training set and associated with the "cat" image class. The unclassified group of images 1002 was employed as an evaluation set of images. The evaluation set of images were applied to the classifier to score their correlation with the visual pattern templates associated with the "cat" image class. The scores of the evaluation set of images were ranked, and the highest ranked images from the evaluation set of images were selected as the classified group of images 1004.

Social Networking System—Example Implementation

Figure 11:
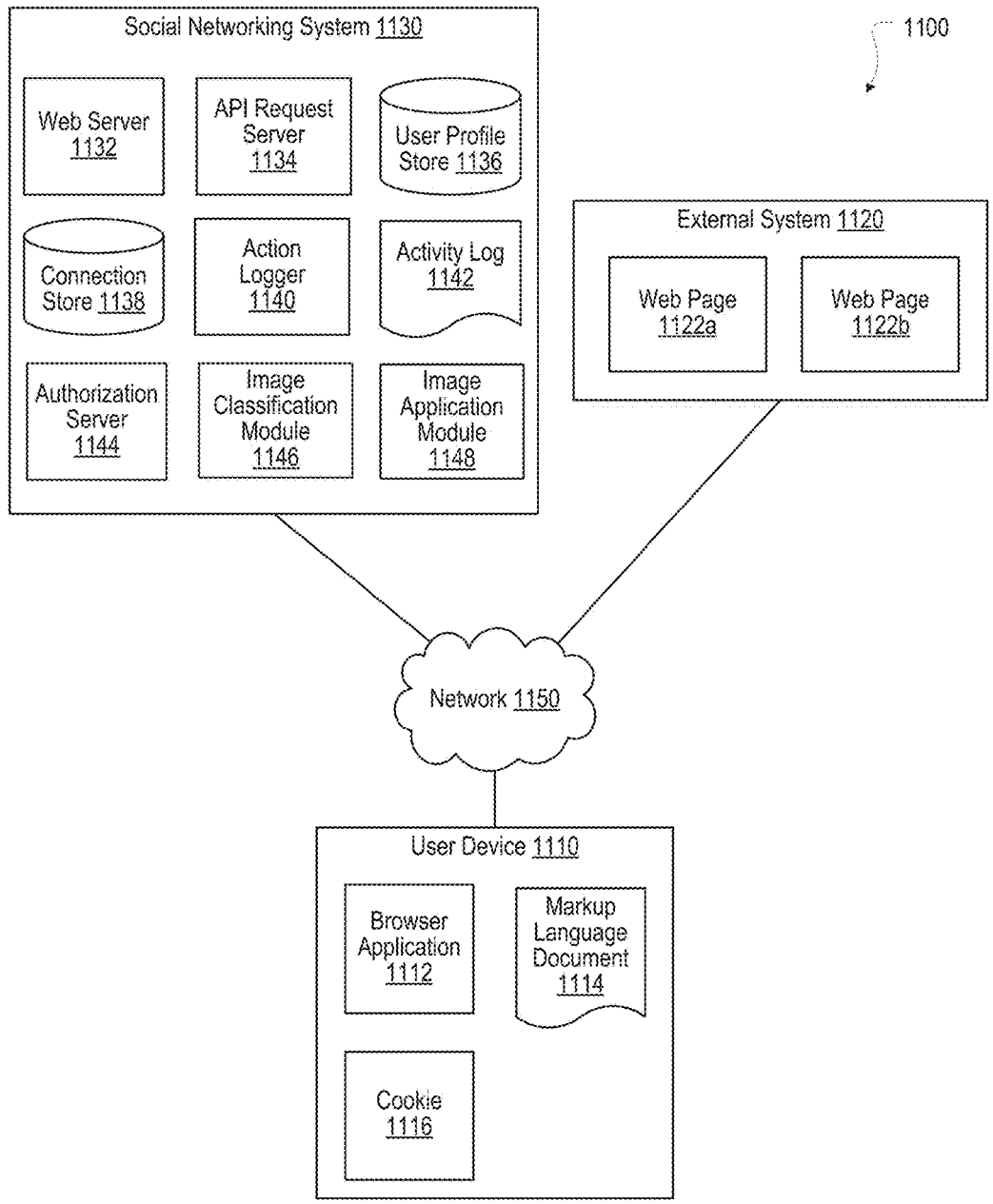
FIG. 11 shows an example of a network diagram of a contextual image classification system within a social networking system, in accordance with some embodiments.

FIG. 11 is a network diagram of an example social networking system 1100 in which to implement the contextual image classification system 102, in accordance with some embodiments. The social networking system 1100 includes one or more user devices 1110, one or more external systems 1120, a social networking system 1130, and a network 1150. In an embodiment, the social networking system discussed in connection with the embodiments described above may be implemented as the social networking system 1130. For purposes of illustration, the embodiment of the social networking system 1100, shown by FIG. 11, includes a single external system 1120 and a single user device 1110. However, in other embodiments, the social networking system 1100 may include more user devices 1110 and/or more external systems 1120. In certain embodiments, the social networking system 1130 is operated by a social networking system provider, whereas the external systems 1120 are separate from the social networking system 1130 in that they may be operated by different entities. In various embodiments, however, the social networking system 1130 and the external systems 1120 operate in conjunction to provide social networking services to users (or members) of the social networking system 1130. In this sense, the social networking system 1130 provides a platform or backbone, which other systems, such as external systems 1120, may use to provide social networking services and functionalities to users across the Internet.

The user device 1110 comprises one or more computing devices that can receive input from a user and transmit and receive data via the network 1150. In one embodiment, the user device 1110 is a conventional computer system executing, for example, a Microsoft Windows compatible operating system (OS), Apple OS X, and/or a Linux distribution. In another embodiment, the user device 1110 can be a device having computer functionality, such as a smart-phone, a tablet, a personal digital assistant (PDA), a mobile telephone, etc. The user device 1110 is configured to communicate via the network 1150. The user device 1110 can execute an application, for example, a browser application that allows a user of the user device 1110 to interact with the social networking system 1130. In another embodiment, the user device 1110 interacts with the social networking system 1130 through an application programming interface (API) provided by the native operating system of the user device 1110, such as iOS and ANDROID. The user device 1110 is configured to communicate with the external system 1120 and the social networking system 1130 via the network 1150, which may comprise any combination of local area and/or wide area networks, using wired and/or wireless communication systems.

In one embodiment, the network 1150 uses standard communications technologies and protocols. Thus, the network 1150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 1150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1110 may display content from the external system 1120 and/or from the social networking system 1130 by processing a markup language document 1114 received from the external system 1120 and from the social networking system 1130 using a browser application 1112. The markup language document 1114 identifies content and one or more instructions describing formatting or presentation of the content. By executing the instructions included in the markup language document 1114, the browser application 1112 displays the identified content using the format or presentation described by the markup language document 1114. For example, the markup language document 1114 includes instructions for generating and displaying a web page having multiple frames that include text and/or image data retrieved from the external system 1120 and the social networking system 1130. In various embodiments, the markup language document 1114 comprises a data file including extensible markup language (XML) data, extensible hypertext markup language (XHTML) data, or other markup language data. Additionally, the markup language document 1114 may include JavaScript Object Notation (JSON) data, JSON with padding (JSONP), and JavaScript data to facilitate data-interchange between the external system 1120 and the user device 1110. The browser application 1112 on the user device 1110 may use a JavaScript compiler to decode the markup language document 1114.

The markup language document 1114 may also include, or link to, applications or application frameworks such as FLASH™ or Unity™ applications, the SilverLight™ application framework, etc.

In one embodiment, the user device 1110 also includes one or more cookies 1116 including data indicating whether a user of the user device 1110 is logged into the social networking system 1130, which may enable modification of the data communicated from the social networking system 1130 to the user device 1110.

The external system 1120 includes one or more web servers that include one or more web pages 1122a, 1122b, which are communicated to the user device 1110 using the network 1150. The external system 1120 is separate from the social networking system 1130. For example, the external system 1120 is associated with a first domain, while the social networking system 1130 is associated with a separate social networking domain. Web pages 1122a, 1122b, included in the external system 1120, comprise markup language documents 1114 identifying content and including instructions specifying formatting or presentation of the identified content.

The social networking system 1130 includes one or more computing devices for a social networking system, including a plurality of users, and providing users of the social networking system with the ability to communicate and interact with other users of the social networking system. In some instances, the social networking system can be represented by a graph, i.e., a data structure including edges and nodes. Other data structures can also be used to represent the social networking system, including but not limited to databases, objects, classes, meta elements, files, or any other data structure. The social networking system 1130 may be administered, managed, or controlled by an operator. The operator of the social networking system 1130 may be a human being, an automated application, or a series of applications for managing content, regulating policies, and collecting usage metrics within the social networking system 1130. Any type of operator may be used.

Users may join the social networking system 1130 and then add connections to any number of other users of the social networking system 1130 to whom they desire to be connected. As used herein, the term "friend" refers to any other user of the social networking system 1130 to whom a user has formed a connection, association, or relationship via the social networking system 1130. For example, in an embodiment, if users in the social networking system 1130 are represented as nodes in the social graph, the term "friend" can refer to an edge formed between and directly connecting two user nodes.

Connections may be added explicitly by a user or may be automatically created by the social networking system 1130 based on common characteristics of the users (e.g., users who are alumni of the same educational institution). For example, a first user specifically selects a particular other user to be a friend. Connections in the social networking system 1130 are usually in both directions, but need not be, so the terms "user" and "friend" depend on the frame of reference. Connections between users of the social networking system 1130 are usually bilateral ("two-way"), or "mutual," but connections may also be unilateral, or "one-way." For example, if Bob and Joe are both users of the social networking system 1130 and connected to each other, Bob and Joe are each other's connections. If, on the other hand, Bob wishes to connect to Joe to view data communicated to the social networking system 1130 by Joe, but Joe does not wish to form a mutual connection, a unilateral connection may be established. The connection between users may be a direct connection; however, some embodiments of the social networking system 1130 allow the connection to be indirect via one or more levels of connections or degrees of separation.

In addition to establishing and maintaining connections between users and allowing interactions between users, the social networking system 1130 provides users with the ability to take actions on various types of items supported by the social networking system 1130. These items may include groups or networks (i.e., social networks of people, entities, and concepts) to which users of the social networking system 1130 may belong, events or calendar entries in which a user might be interested, computer-based applications that a user may use via the social networking system 1130, transactions that allow users to buy or sell items via services provided by or through the social networking system 1130, and interactions with advertisements that a user may perform on or off the social networking system 1130. These are just a few examples of the items upon which a user may act on the social networking system 1130, and many others are possible. A user may interact with anything that is capable of being represented in the social networking system 1130 or in the external system 1120, separate from the social networking system 1130, or coupled to the social networking system 1130 via the network 1150.

The social networking system 1130 is also capable of linking a variety of entities. For example, the social networking system 1130 enables users to interact with each other as well as external systems 1120 or other entities through an API, a web service, or other communication channels. The social networking system 1130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1130 modifies edges connecting the various nodes to reflect the relationships and interactions.

The social networking system 1130 also includes user-generated content, which enhances a user's interactions with the social networking system 1130. User-generated content may include anything a user can add, upload, send, or "post" to the social networking system 1130. For example, a user communicates posts to the social networking system 1130 from a user device 1110. Posts may include data such as status updates or other textual data, location information, images such as photos, videos, links, music or other similar data and/or media. Content may also be added to the social networking system 1130 by a third party. Content "items" are represented as objects in the social networking system 1130. In this way, users of the social networking system 1130 are encouraged to communicate with each other by posting text and content items of various types of media through various communication channels. Such communication increases the interaction of users with each other and increases the frequency with which users interact with the social networking system 1130.

The social networking system 1130 includes a web server 1132, an API request server 1134, a user profile store 1136, a connection store 1138, an action logger 1140, an activity log 1142, an authorization server 1144, an image classification module 1146, and an image application module 1148. In an embodiment, the social networking system 1130 may include additional, fewer, or different components for various applications. Other components, such as network interfaces, security mechanisms, load balancers, failover servers, management and network operations consoles, and the like are not shown so as to not obscure the details of the system.

The user profile store 1136 maintains information about user accounts, including biographic, demographic, and other types of descriptive information, such as work experience, educational history, hobbies or preferences, location, and the like that has been declared by users or inferred by the social networking system 1130. This information is stored in the user profile store 1136 such that each user is uniquely identified. The social networking system 1130 also stores data describing one or more connections between different users in the connection store 1138. The connection information may indicate users who have similar or common work experience, group memberships, hobbies, or educational history. Additionally, the social networking system 1130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1130, such as non-person entities, buckets, cluster centers, images, interests, pages, external systems, concepts, and the like are also stored in the connection store 1138.

The social networking system 1130 maintains data about objects with which a user may interact. To maintain this data, the user profile store 1136 and the connection store 1138 store instances of the corresponding type of objects maintained by the social networking system 1130. Each object type has information fields that are suitable for storing information appropriate to the type of object. For example, the user profile store 1136 contains data structures with fields suitable for describing a user's account and information related to a user's account. When a new object of a particular type is created, the social networking system 1130 initializes a new data structure of the corresponding type, assigns a unique object identifier to it, and begins to add data to the object as needed. This might occur, for example, when a user becomes a user of the social networking system 1130, the social networking system 1130 generates a new instance of a user profile in the user profile store 1136, assigns a unique identifier to the user account, and begins to populate the fields of the user account with information provided by the user.

The connection store 1138 includes data structures suitable for describing a user's connections to other users, connections to external systems 1120 or connections to other entities. The connection store 1138 may also associate a connection type with a user's connections, which may be used in conjunction with the user's privacy setting to regulate access to information about the user. In an embodiment, the user profile store 1136 and the connection store 1138 may be implemented as a federated database.

Data stored in the connection store 1138, the user profile store 1136, and the activity log 1142 enables the social networking system 1130 to generate the social graph that uses nodes to identify various objects and edges connecting nodes to identify relationships between different objects. For example, if a first user establishes a connection with a second user in the social networking system 1130, user accounts of the first user and the second user from the user profile store 1136 may act as nodes in the social graph. The connection between the first user and the second user stored by the connection store 1138 is an edge between the nodes associated with the first user and the second user. Continuing this example, the second user may then send the first user a message within the social networking system 1130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1130 (or, alternatively, in an image maintained by another system outside of the social networking system 1130). The image may itself be represented as a node in the social networking system 1130. This tagging action may create edges between the first user and the second user as well as create an edge between each of the users and the image, which is also a node in the social graph. In yet another example, if a user confirms attending an event, the user and the event are nodes obtained from the user profile store 1136, where the attendance of the event is an edge between the nodes that may be retrieved from the activity log 1142. By generating and maintaining the social graph, the social networking system 1130 includes data describing many different types of objects and the interactions and connections among those objects, providing a rich source of socially relevant information.

The web server 1132 links the social networking system 1130 to one or more user devices 1110 and/or one or more external systems 1120 via the network 1150. The web server 1132 serves web pages, as well as other web-related content, such as Java, JavaScript, Flash, XML, and so forth. The web server 1132 may include a mail server or other messaging functionality for receiving and routing messages between the social networking system 1130 and one or more user devices 1110. The messages can be instant messages, queued messages (e.g., email), text and SMS messages, or any other suitable messaging format.

The API request server 1134 allows one or more external systems 1120 and user devices 1110 to call access information from the social networking system 1130 by calling one or more API functions. The API request server 1134 may also allow external systems 1120 to send information to the social networking system 1130 by calling APIs. The external system 1120, in one embodiment, sends an API request to the social networking system 1130 via the network 1150, and the API request server 1134 receives the API request. The API request server 1134 processes the request by calling an API associated with the API request to generate an appropriate response, which the API request server 1134 communicates to the external system 1120 via the network 1150. For example, responsive to an API request, the API request server 1134 collects data associated with a user, such as the user's connections that have logged into the external system 1120, and communicates the collected data to the external system 1120. In another embodiment, the user device 1110 communicates with the social networking system 1130 via APIs in the same manner as external systems 1120.

The action logger 1140 is capable of receiving communications from the web server 1132 about user actions on and/or off the social networking system 1130. The action logger 1140 populates the activity log 1142 with information about user actions, enabling the social networking system 1130 to discover various actions taken by its users within the social networking system 1130 and outside of the social networking system 1130. Any action that a particular user takes with respect to another node on the social networking system 1130 may be associated with each user's account, through information maintained in the activity log 1142 or in a similar database or other data repository. Examples of actions taken by a user within the social networking system 1130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1130, the action is recorded in the activity log 1142. In one embodiment, the social networking system 1130 maintains the activity log 1142 as a database of entries. When an action is taken within the social networking system 1130, an entry for the action is added to the activity log 1142. The activity log 1142 may be referred to as an action log.

Additionally, user actions may be associated with concepts and actions that occur within an entity outside of the social networking system 1130, such as an external system 1120 that is separate from the social networking system 1130. For example, the action logger 1140 may receive data describing a user's interaction with an external system 1120 from the web server 1132. In this example, the external system 1120 reports a user's interaction according to structured actions and objects in the social graph.

Other examples of actions where a user interacts with an external system 1120 include a user expressing an interest in an external system 1120 or another entity, a user posting a comment to the social networking system 1130 that discusses an external system 1120 or a web page 1122a within the external system 1120, a user posting to the social networking system 1130 a Uniform Resource Locator (URL) or other identifier associated with an external system 1120, a user attending an event associated with an external system 1120, or any other action by a user that is related to an external system 1120. Thus, the activity log 1142 may include actions describing interactions between a user of the social networking system 1130 and an external system 1120 that is separate from the social networking system 1130.

The authorization server 1144 enforces one or more privacy settings of the users of the social networking system 1130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1120. One embodiment allows the specification of the set of entities to comprise an enumeration of entities. For example, the user may provide a list of external systems 1120 that are allowed to access certain information. Another embodiment allows the specification to comprise a set of entities along with exceptions that are not allowed to access the information. For example, a user may allow all external systems 1120 to access the user's work information, but specify a list of external systems 1120 that are not allowed to access the work information. Certain embodiments call the list of exceptions that are not allowed to access certain information a "block list". External systems 1120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1144 contains logic to determine if certain information associated with a user can be accessed by a user's friends, external systems 1120, and/or other applications and entities. The external system 1120 may need authorization from the authorization server 1144 to access the user's more private and sensitive information, such as the user's work phone number. Based on the user's privacy settings, the authorization server 1144 determines if another user, the external system 1120, an application, or another entity is allowed to access information associated with the user, including information about actions taken by the user.

In the example of FIG. 11, the social networking system 1130 may include the image classification module 1146 and the image application module 1148, as described in more detail herein. In an embodiment, the image classification module 1146 may gather contextual cues for a sample set of images and use the contextual cues to generate a training set of images. The training set of images may be used to train a classifier to generate visual pattern templates of an image class. The classifier may score an evaluation set of images based on correlation with the visual pattern templates. The highest scoring images of the evaluation set of images may be deemed to be mostly closely related to the image class. In an embodiment, the image classification module 1146 may be implemented as the image classification module 104. The image application module 1148 may interface with other applications to allow for searching of classified images. In an embodiment, the image application module 1148 may be implemented as the image application module 106.

Hardware Implementation

Figure 12:
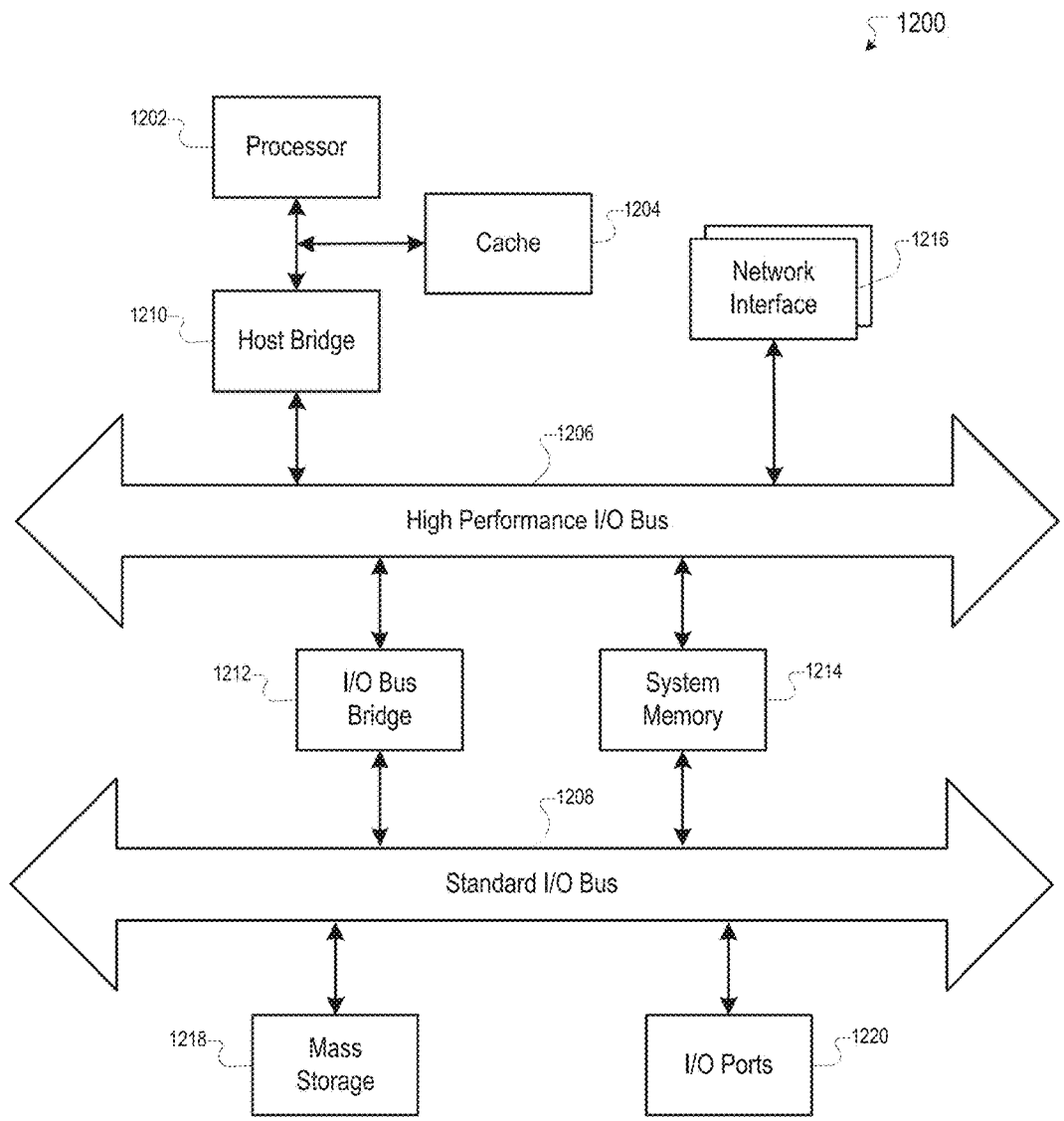
FIG. 12 shows an example of a computer system that may be used to implement one or more of the embodiments described herein in accordance with some embodiments.

The foregoing processes and features can be implemented by a wide variety of machine and computer system architectures and in a wide variety of network and computing environments. FIG. 12 illustrates an example of a computer system 1200 that may be used to implement one or more of the embodiments described herein in accordance with an embodiment. The computer system 1200 includes sets of instructions for causing the computer system 1200 to perform the processes and features discussed herein. The computer system 1200 may be connected (e.g., networked) to other machines. In a networked deployment, the computer system 1200 may operate in the capacity of a server machine or a client machine in a client-server network environment, or as a peer machine in a peer-to-peer (or distributed) network environment. In an embodiment, the computer system 1200 may be the social networking system 1130, the user device 1110, and the external system 1120, or a component thereof. In an embodiment, the computer system 1200 may be one server among many that constitutes all or part of the social networking system 1130.

The computer system 1200 includes a processor 1202, a cache 1204, and one or more executable modules and drivers, stored on a computer-readable medium, directed to the processes and features described herein. Additionally, the computer system 1200 includes a high performance input/output (I/O) bus 1206 and a standard I/O bus 1212. A host bridge 1210 couples processor 1202 to high performance I/O bus 1206, whereas I/O bus bridge 1212 couples the two buses 1206 and 1212 to each other. A system memory 1214 and a network interface 1216 couple to high performance I/O bus 1206. The computer system 1200 may further include video memory and a display device coupled to the video memory (not shown). Mass storage 1218 and I/O ports 1220 couple to the standard I/O bus 1212. The computer system 1200 may optionally include a keyboard and pointing device, a display device, or other input/output devices (not shown) coupled to the standard I/O bus 1212. Collectively, these elements are intended to represent a broad category of computer hardware systems, including but not limited to computer systems based on the x126-compatible processors manufactured by Intel Corporation of Santa Clara, Calif., and the x126-compatible processors manufactured by Advanced Micro Devices (AMD), Inc., of Sunnyvale, Calif., as well as any other suitable processor.

An operating system manages and controls the operation of the computer system 1200, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1200 are described in greater detail below. In particular, the network interface 1216 provides communication between the computer system 1200 and any of a wide range of networks, such as an Ethernet (e.g., IEEE 1202.3) network, a backplane, etc. The mass storage 1218 provides permanent storage for the data and programming instructions to perform the above-described processes and features implemented by the respective computing systems identified above, whereas the system memory 1214 (e.g., DRAM) provides temporary storage for the data and programming instructions when executed by the processor 1202. The I/O ports 1220 may be one or more serial and/or parallel communication ports that provide communication between additional peripheral devices, which may be coupled to the computer system 1200.

The computer system 1200 may include a variety of system architectures, and various components of the computer system 1200 may be rearranged. For example, the cache 1204 may be on-chip with processor 1202. Alternatively, the cache 1204 and the processor 1202 may be packed together as a "processor module", with processor 1202 being referred to as the "processor core". Furthermore, certain embodiments may neither require nor include all of the above components. For example, peripheral devices coupled to the standard I/O bus 1212 may couple to the high performance I/O bus 1206. In addition, in some embodiments, only a single bus may exist, with the components of the computer system 1200 being coupled to the single bus. Furthermore, the computer system 1200 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1200 that, when read and executed by one or more processors, cause the computer system 1200 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1200, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1202. Initially, the series of instructions may be stored on a storage device, such as the mass storage 1218. However, the series of instructions can be stored on any suitable computer readable storage medium. Furthermore, the series of instructions need not be stored locally, and could be received from a remote storage device, such as a server on a network, via the network interface 1216. The instructions are copied from the storage device, such as the mass storage 1218, into the system memory 1214 and then accessed and executed by the processor 1202. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1200 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed:

1. A system comprising:
   at least one processor; and
   a memory storing instructions configured to instruct the at least one processor to perform:
   receiving a sample set of images from which images are selected to train an image classifier associated with a plurality of image classes, at least one image in the sample set associated with one or more social cues, the one or more social cues comprising reliability of at least one of a generator or a tagger of the at least one image based on interactions of the at least one of the generator or the tagger on a social networking system;
   scoring correlation of the at least one image in the sample set with an image class of the plurality of image classes based on the one or more social cues, wherein
      each image class of the plurality of image classes is associated with depiction of an object, action, or concept, and
      the scoring comprises generating a score indicative of an extent to which the at least one image depicts the image class; and
   determining a training set of images to train the classifier from the sample set based on the scoring.

2. The system of claim 1, further comprising specifying the image class.

3. The system of claim 1, wherein the determining comprises ranking each image in the sample set of images based on the scoring.

4. The system of claim 1, wherein the determining comprises selecting a top scoring subset of the sample set of images.

5. The system of claim 4, wherein the top scoring subset is the training set of images.

6. The system of claim 1, further comprising training the classifier based on the training set of images.

7. The system of claim 1, further comprising generating a visual pattern template associated with the image class.

8. The system of claim 1, wherein the classifier is configured to use a bag of visual words image classification technique or a neural network image classification technique.

9. The system of claim 1, further comprising determining an extent to which an evaluation set of images correlates with the image class.

10. The system of claim 9, wherein the evaluation set of images is different from the sample set of images.

11. The system of claim 9, wherein the evaluation set of images comprises a larger set of images than the sample set of images.

12. The system of claim 9, further comprising scoring correlation of each image of the evaluation set of images with a visual pattern template associated with the image class.

13. The system of claim 12, further comprising ranking each image of the evaluation set based on the scoring correlation of each image of the evaluation set of images.

14. The system of claim 12, further comprising associating a top scoring subset of the evaluation set of images with the image class.

15. The system of claim 1, wherein the one or more social cues comprises one or more image tags.

16. The system of claim 15, further comprising determining a number of instances of a particular image tag among a total number of the one or more image tags associated with an image.

17. The system of claim 1, wherein the one or more social cues comprises one or more of: location data associated with an image of the sample set of images; or an identity of a tagger or an uploader of the image of the sample set of images.

18. The system of claim 1, wherein the one or more social cues are received by a social networking system.

19. A computer implemented method comprising:
   receiving, by a computer system, a sample set of images from which images are selected to train an image classifier associated with a plurality of image classes, at least one image in the sample set associated with one or more social cues, the one or more social cues comprising reliability of at least one of a generator or a tagger of the at least one image based on interactions of the at least one of the generator or the tagger on a social networking system;

scoring, by the computer system, correlation of the at least one image in the sample set with an image class of the plurality of image classes based on the one or more social cues, wherein each image class of the plurality of image classes is associated with depiction of an object, action, or concept, and the scoring comprises generating a score indicative of an extent to which the at least one image depicts the image class; and determining, by the computer system, a training set of images to train the classifier from the sample set based on the scoring.

20. A non-transitory computer storage medium storing computer-executable instructions that, when executed, cause a computer system to perform a computer-implemented method comprising:

receiving a sample set of images from which images are selected to train an image classifier associated with a plurality of image classes, at least one image in the sample set associated with one or more social cues, the one or more social cues comprising reliability of at least one of a generator or a tagger of the at least one image based on interactions of the at least one of the generator or the tagger on a social networking system;

scoring correlation of the at least one image in the sample set with an image class of the plurality of image classes based on the one or more social cues, wherein each image class of the plurality of image classes is associated with depiction of an object, action, or concept, and the scoring comprises generating a score indicative of an extent to which the at least one image depicts the image class; and determining a training set of images to train the classifier from the sample set based on the scoring.

* * * * *